March 17, 1953 W. B. WIGTON ET AL 2,631,500

MACHINE TOOL

Filed Aug. 30, 1947 10 Sheets-Sheet 1

INVENTOR.
WALTER B. WIGTON
BY JESSE DAUGHERTY
Joseph A. Rave
Atty

March 17, 1953 W. B. WIGTON ET AL 2,631,500

MACHINE TOOL

Filed Aug. 30, 1947 10 Sheets-Sheet 2

INVENTOR.
WALTER B. WIGTON
BY JESSE DAUGHERTY
Joseph A. Rave
Atty

INVENTOR.
WALTER B. WIGTON
JESSE DAUGHERTY
BY Joseph A. Rave
Atty.

March 17, 1953 W. B. WIGTON ET AL 2,631,500

MACHINE TOOL

Filed Aug. 30, 1947 10 Sheets-Sheet 4

INVENTOR.

WALTER B. WIGTON

BY JESSE DAUGHERTY

Joseph A. Rave

Atty.

FIG. 10
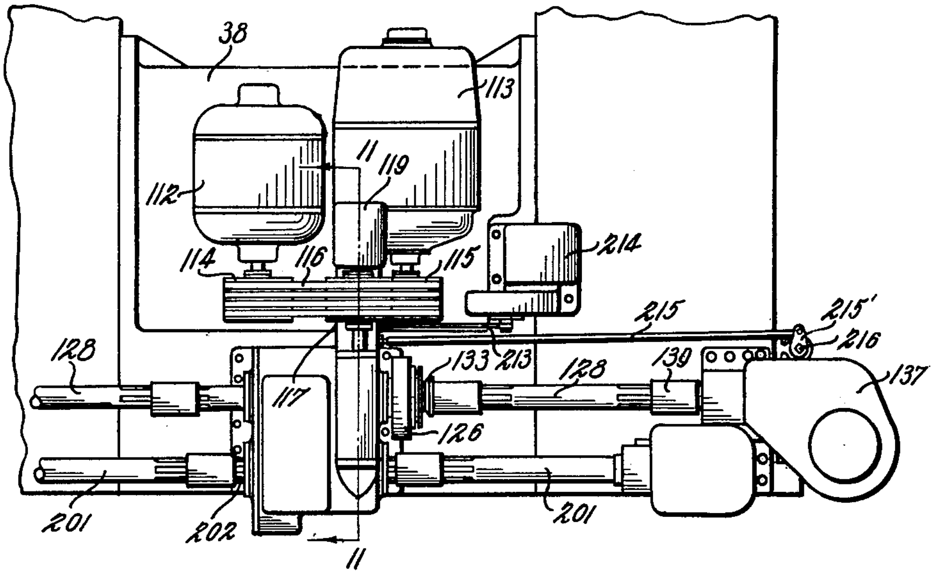
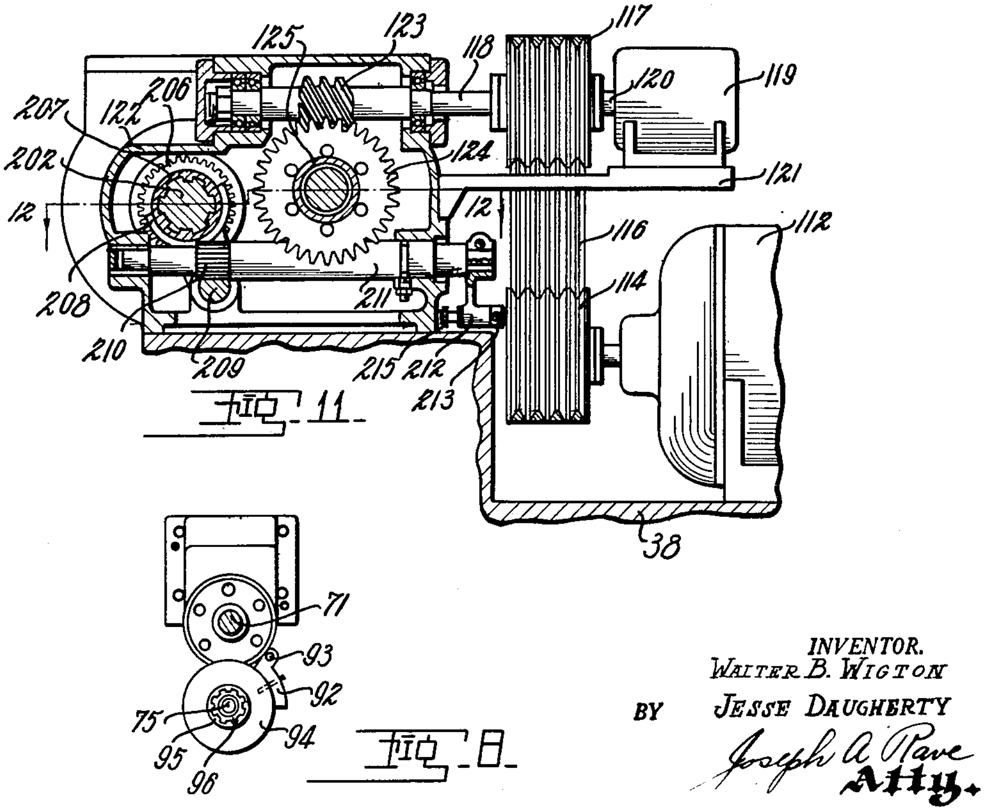
FIG. 11, FIG. 8
INVENTOR.
WALTER B. WIGTON
BY JESSE DAUGHERTY
Joseph A. Rave
Atty.

INVENTOR.
WALTER B. WIGTON
BY JESSE DAUGHERTY
Joseph A. Rane
Atty.

March 17, 1953 W. B. WIGTON ET AL 2,631,500

MACHINE TOOL

Filed Aug. 30, 1947 10 Sheets-Sheet 7

INVENTOR.
WALTER B. WIGTON
BY JESSE DAUGHERTY
Joseph A. Rave
Atty.

INVENTOR.
WALTER B. WIGTON
BY JESSE DAUGHERTY
Joseph A. Rave
Atty.

INVENTOR.
WALTER B. WIGTON
JESSE DAUGHERTY
BY
Joseph A. Rave
Atty.

March 17, 1953 W. B. WIGTON ET AL 2,631,500

MACHINE TOOL

Filed Aug. 30, 1947 10 Sheets-Sheet 10

INVENTOR.
WALTER B. WIGTON
JESSE DAUGHERTY
BY Joseph A. Rave
Atty.

Patented Mar. 17, 1953 2,631,500

UNITED STATES PATENT OFFICE 2,631,500

MACHINE TOOL

Walter B. Wigton and Jesse Daugherty, Cincinnati, Ohio, assignors, by mesne assignments, to Giddings & Lewis Machine Tool Company, Fond du Lac, Wis., a corporation of Wisconsin Application August 30, 1947, Serial No. 771,418

55 Claims. (Cl. 90—15)

1

This invention relates to improvements in machine tools and particularly to improvements in actuating and control means for effecting and controlling the relative movement of a plurality of supporting members, such for example as translatable members carrying work and tools that are to be moved relative to one another.

The invention has been illustrated and will be described in connection with a planer-miller type of machine tool, that is, a machine tool embodying machine tool construction normally associated with a metal planer with which is utilized rotating tools and means for effecting the rotation and feeding of said rotating tools that are normally associated with milling machines. It is to be understood however that the invention is not limited to planer-miller types of machine tools but has application to any type of a machine that requires relative movement and control of such movement between a work supporting member or table and a tool supporting member or head or a plurality of such tool supporting members each of which may be sequentially actuated or which may be simultaneously actuated.

Broadly speaking machine tools having relatively movable members for work and tools and including control means for controlling the direction and rate of movement of said members are old. In the past however the said control means was quite cumbersome and required large numbers of movable or shiftable elements such as clutches, change gears of the sliding type or the pick off type, differentials, and motors of constant and variable speeds but which drove or operated through gear trains that in turn had to be manually adjusted to obtain the desired direction and rate of movement of the tool or work slide or slides.

Another difficulty heretofore encountered, and which required large amounts of expensive machine elements to obtain an approximation of the desired speed in the support members, is the fact that present day tools are capable of operating at quite high feeding rates and yet must be operated at relatively low rates, for example, a milling machine utilizing rotating cutters must have a feeding range in the order of approximately one inch to sixty inches, or more, per minute while other machine tools may operate, since they may use different types of cutters, at a feeding rate well in excess of the said sixty inches or five feet per minute. At the same time in order to obtain proper production from such machine tools, which may utilize a bed having a length of forty feet or more, a much higher rate of speed is required for returning the table to its initial point of operation and this rapid rate of movement should be approximately twenty feet or two hundred forty inches or more per minute. From this it follows that the supports or translatable members should have an overall range of speeds of one inch to two hundred and forty inches per minute, or in the ratio of 1 to 240.

2

It was in an attempt to obtain this range of speeds that prior constructions were designed that utilized clutches for connecting in various gear trains which in themselves were variable through change gears of the sliding and pick off type but in no instance were they fully successful although at a cost considerably in excess of the cost of the present invention.

Another difficulty with prior art construction was that the variations in speeds were at definite increments as effected by particular gear combinations and clutch settings while with the present invention, and particularly through the feed ranges of one inch to sixty inches per minute the variations are unlimited.

In the past, in machine tools of the planer-miller type, attempts have been made to obtain the full speed ranges of one inch to two hundred and forty inches per minute through the use of a single motor power plant and adjustable speed transmission system or systems which were extremely expensive to the point of being prohibitive with the result that flexibility in adjustment of speed in simultaneous movement of the tool slide or tool slides and work slide was sacrificed. By the present invention two independent power plants are employed each with a transmission system which have a combined cost considerably less than the single motor power plant cost and driven mechanism and at the same time affords great flexibility in speed adjustment so that it is possible to machine practically any angle or curve by propely proportioning the speeds of the table and that of the tool carrying member or members.

It is, therefore, the principal object of the present invention to provide a machine tool having a plurality of translatable members for supporting work and tools and whereby independent translation and control of the work and tool slides is obtained, and preferably, from a centralized control station which affords the operator a continuous view of the work.

Another object of the present invention is the provision of a machine tool for accomplishing the foregoing object in which the rate of translation of the work and tool slides may be individually varied prior to or during the translation thereof.

Another object of the present invention is the provision of control means for effecting the translation of a work or tool support through a low and a high range of speeds by independent means that cooperate with one another in effecting the translation and the control thereof.

Another object of the present invention is the provision in a machine tool of a work supporting translatable member and a plurality of tool supporting translatable members together with means for effecting and controlling the translation of each of said members at high and low speeds sequentially and/or simultaneously.

A further object of the present invention is the provision in a planer-miller type machine tool of electronic control means for actuating the table through an extremely wide range of speeds and in which separate motors are employed at the low and the high ends of the range with said motors cooperating in initiating the movement of the table, bringing it to speed and decelerating and stopping it.

A still further object of the present invention is the provision in a planer-miller type of a machine tool of electronic means for effecting the translation of the work supporting table, electronic means for effecting the translation of the tool supporting members together with electronic control means whereby the relative translation of said work and tool supporting members may be infinitely varied within the established feed range.

A specific object of the present invention is the provision of a planer-miller type of machine tool having a translatable work supporting table member, and one or more tool supporting slide members and/or head members with each of said translatable members operable through an extremely wide feed range and electronic control means whereby the feed range is selectably variable for each member.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 8 is an elevational view of certain of the parts of the table drive as seen from line 8—8 on Fig. 5.

Fig. 10 is an enlarged top plan view of certain parts of the machine and illustrating the power plant for the side heads, rail and rail heads.

Fig. 11 is a fragmentary sectional view through the power plant of Fig. 10 taken on line 11—11 on said Fig. 10.

Fig. 19 is an enlarged sectional view of certain parts of the rail and specifically the left hand end thereof for actuating the clutch illustrated in Fig. 18.

Throughout the several views of the drawings similar reference characters are employed to denote the same or similar parts.

Figure 1:
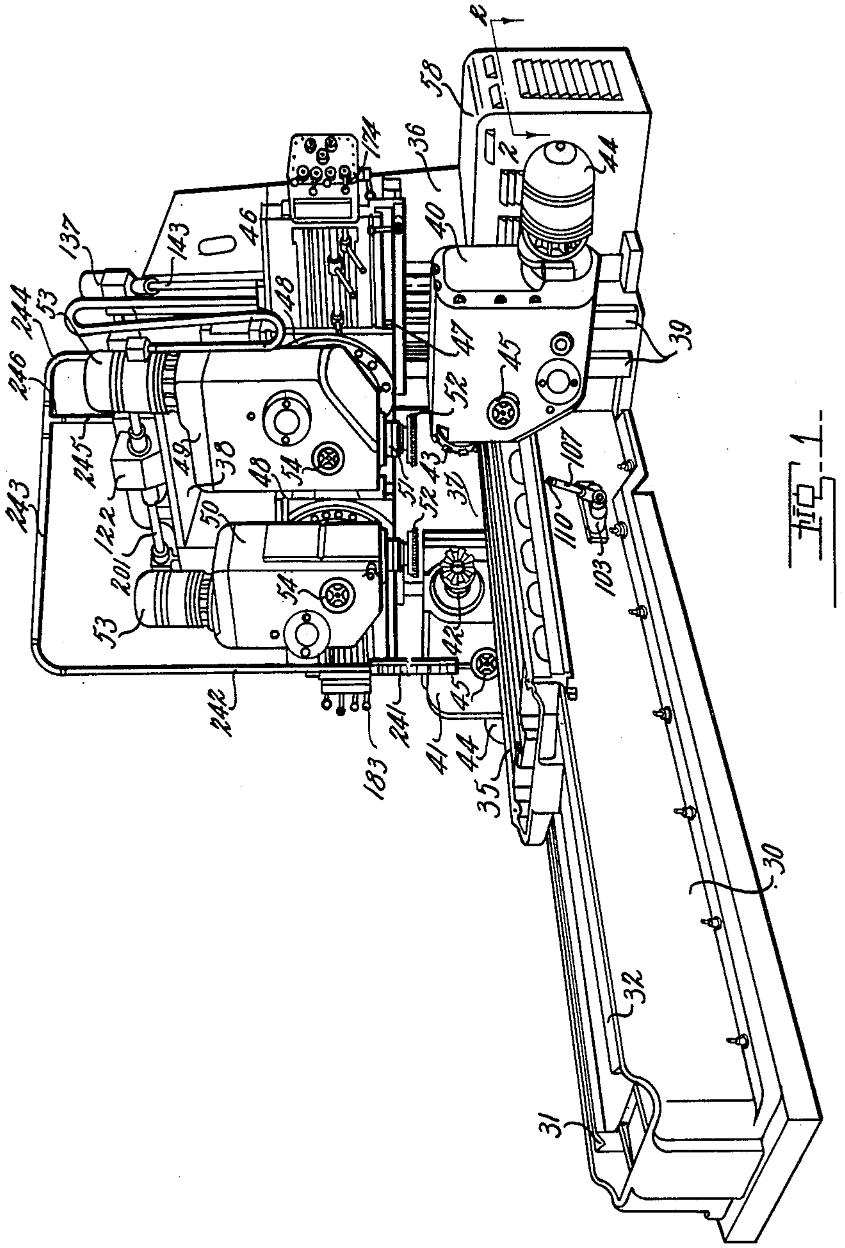
Fig. 1 is a perspective view of a machine tool, specifically, a planer type milling machine embodying the improvements of this invention.

As was noted above this invention is illustrated in the drawings in connection with a planer type milling machine or a planer-miller. This type of a machine tool is quite large having a bed length up to forty feet or more in length and a table of at least half the bed length which traverses the bed at comparatively slow feeding rates which are in the range of one inch to sixty inches or more per minute as is required depending upon the size and material of the tool being used and the kind of material being machined. The traverse rate is in the nature of two hundred and forty inches per minute and is used for bringing the work and tool into operative position for effecting a tooling operation on the work, for rapidly traversing the distance between spaced portions on the work, each of which is to be tooled, and for returning the table from one end of the bed to the other after completion of a tooling operation.

In the type of machine tool illustrated in the drawings substantially the same rate of feed and traverse are to be given to the side tool heads and substantially the same rate of feed and traverse are to be given to the rail in a vertical direction and to the tool heads on said rail in a direction longitudinally of the rail or transversely of the table, as above described are available to the table.

As was noted above this invention contemplates a separate power plant for actuating the table and a separate power plant for actuating the side tool heads, the rail and rail heads with the second power plant couplable with either the side tool heads or the rail or the rail tool heads. In the specific embodiment of the invention herein disclosed, and as will later be made clear, each of the power plants comprises a constant speed alternating current motor and an adjustable speed direct current motor connected for simultaneous movement while effecting the feed and traverse of its parts, together with an electronic control mechanism for each power plant to obtain the maximum results therefrom and afford the maximum protection to the motors. It should be here noted that power plants comprising a single motor adjustable over the whole speed range is within the purview of this invention, and again, that while the specific embodiment of the present invention discloses the use of a direct current motor having a maximum speed less than the speed of the alternating current motor, the use of such alternating and direct current motors each having the same maximum speed is within the contemplation of this invention.

Specifically, the planer-miller illustrated in the drawings comprises a bed 30 having formed at its upper end V ways 31 and 32. Disposed in said V ways 31 and 32 are the V guides 33 and 34 depending from the under side of the work supporting table 35. The bed 30 and table 35 are of usual construction keeping in mind rigidity and stability depending upon the character and type of work to be produced thereby.

Rising from the bed on each side thereof at substantially the mid-point of its length are side housings 36 and 37 connected at their upper ends by the top 38, frequently referred to in the trade as an arch. The side housings 36 and 37 along with the top or arch 38 and bed 30 constitute the main frame of the machine. The side housings 36 and 37 are each provided with suitable guides 39 respectively received in guide ways formed in the rear of heads 40 and 41 which will hereinafter be referred to as the side heads. The side heads 40 and 41 are substantially identical, and in so far as their internal construction is concerned form no part of the present invention but it should be noted that each contains a spindle 42 to the outer ends of which are secured independently replaceable tools 43. Each spindle 42 is rotatably mounted and adapted to be driven by any suitable or desirable means such as electric motor 44 suitably secured or otherwise connected with its spindle 42. The spindles 42 are further adapted to be axially adjusted and for setting up purposes are provided with manually operable means such as hand wheel 45.

Mounted on the guides 39 of side housings 36 and 37 above the heads 40 and 41 is a rail or support slide 46 which spans the distance between said side housings and overlies the table 35. The rail 46 is, in turn, provided on its face longitudinally thereof with guides 47 received in suitable guide ways in the plates 48, respectively, of heads 49 and 50. The heads 49 and 50 will hereinafter be referred to as the rail heads and said heads like the side heads 40 and 41 form no part of the present invention in so far as their structure, per se, is concerned. Each of the heads 49 and 50 is provided with a spindle 51 each adapted to have secured thereto interchangeable cutters or tools 52. Each spindle 51 is adapted to be rotated by any suitable or desirable means such as an electric motor 53, through suitable gearing or transmission mechanism within its head. Each spindle 51 is adapted to be individually axially adjusted for which purpose use may be made of the manually actuable hand wheel 54.

Figures 2, 13, 14:
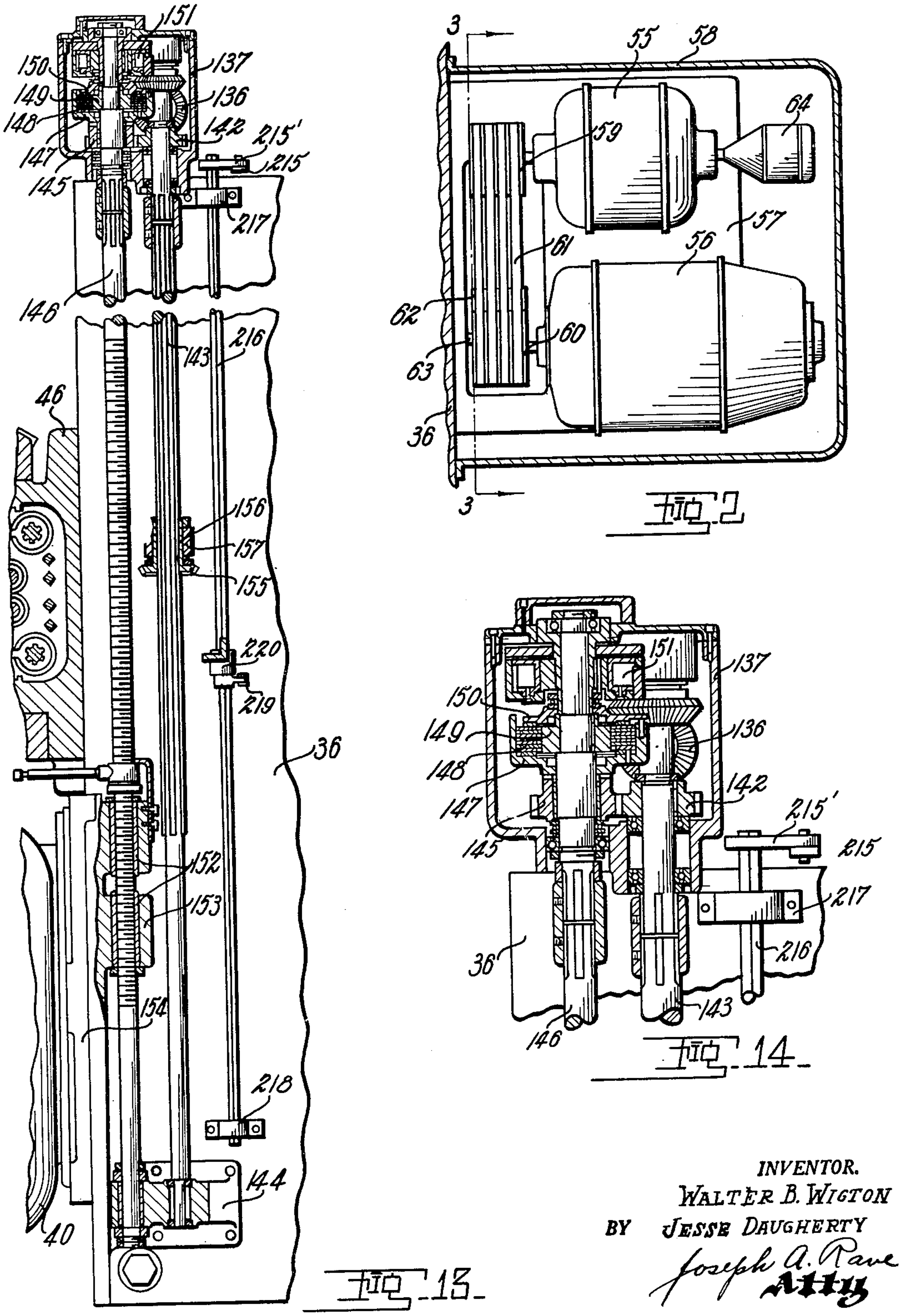
Fig. 2 is an enlarged fragmentary horizontal sectional view through the table drive power plant as seen from line 2—2 on Fig. 1.
Fig. 13 is a vertical sectional view through the heads elevating and translating means as seen from line 13—13 on Fig. 12.
Fig. 14 is an enlarged sectional view of certain parts of Fig. 13 and illustrating the clutch to the heads elevating means forming a detail of the present invention.
Figures 3, 6, 7, 22:
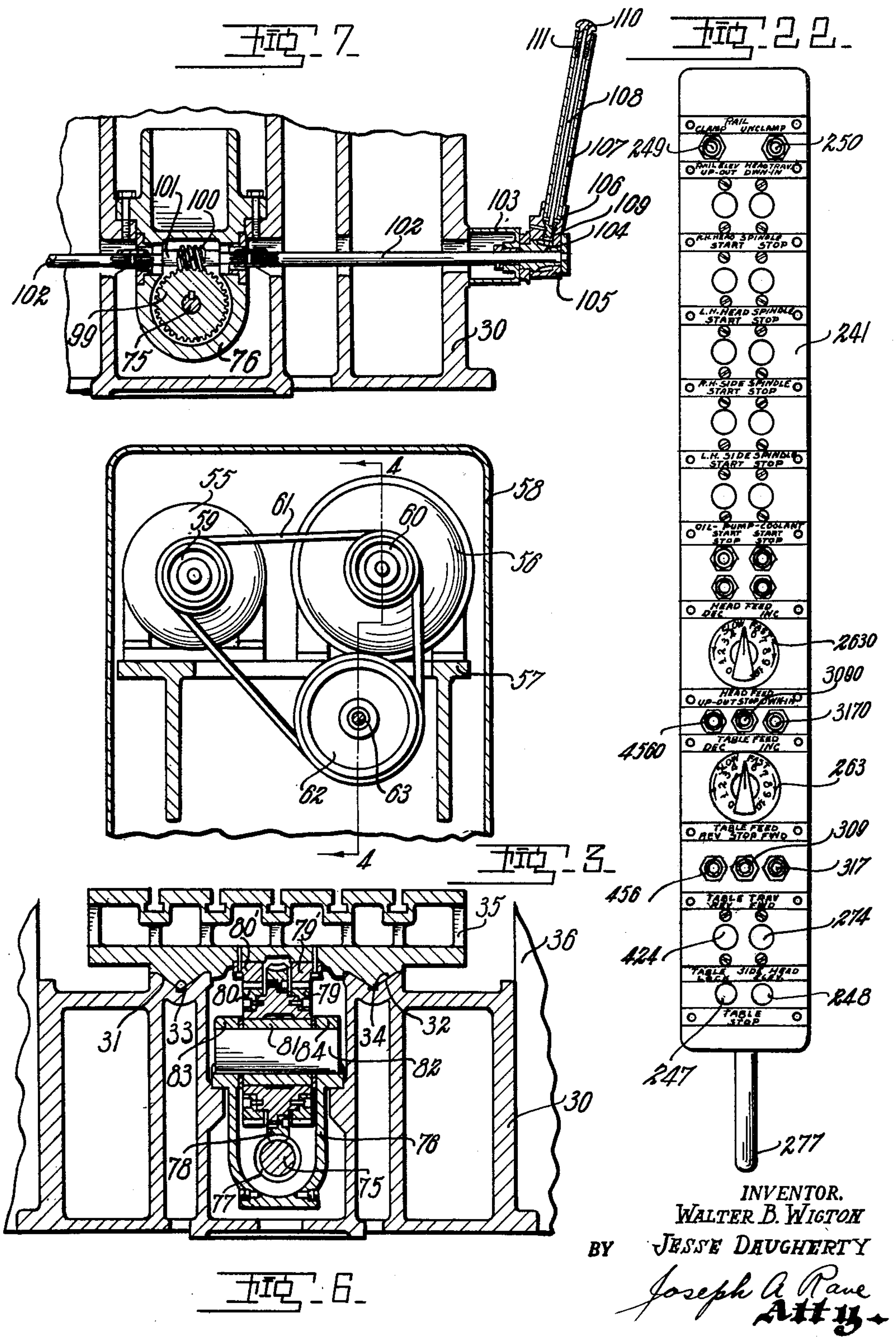
Fig. 3 is a fragmentary elevational view of the power plant of Fig. 2 as seen from line 3—3 on said Fig. 2.
Fig. 6 is a transverse sectional view through the table and illustrating the connection between said table and its driving mechanism taken on line 6—6 on Fig. 5.
Fig. 7 is a fragmentary sectional view through the bed taken through a plane to the left of that of Fig. 6, on line 7—7 on Fig. 5.
Fig. 22 is an enlarged elevational view of the control station for controlling the operation of the table and head power plants.
Figure 4:
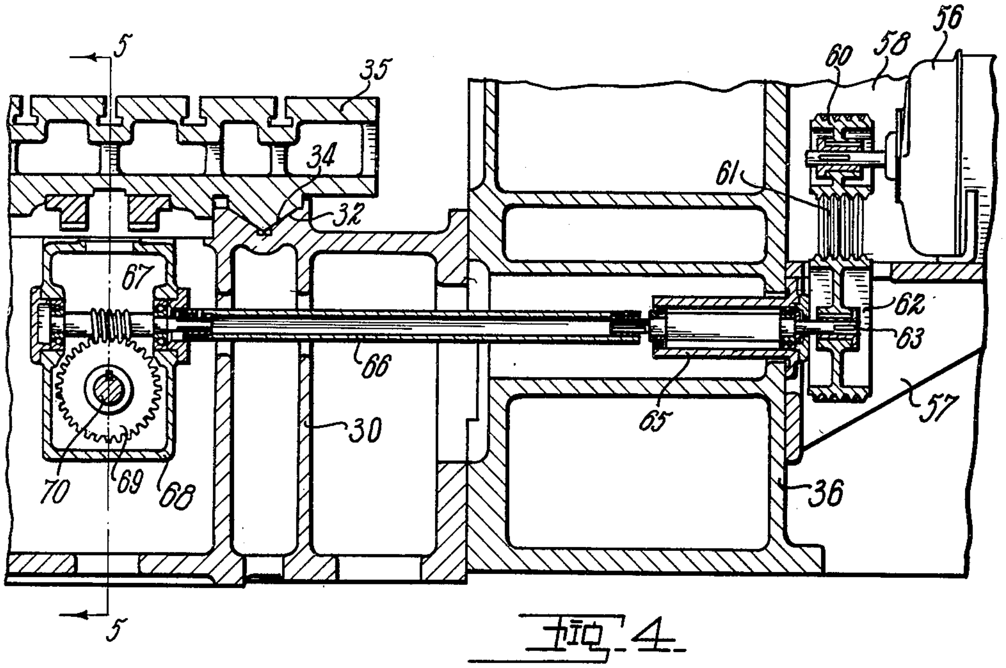
Fig. 4 is a fragmentary vertical sectional view through a portion of the table and illustrating the drive thereto from the power plant, as seen from the line 4—4 on Fig. 3.

The power plant for actuating the table 35 is conveniently located adjacent one of the side housings, housing 36, for example, and as seen in Figs. 2 and 3 comprises a pair of electric motors 55 and 56. The motors 55 and 56 are mounted on a suitable supporting bracket 57 secured to or integral with the said side housing 36 and projecting outwardly thereof. A suitable cover or housing 58 is mounted over the motors 55 and 56. In practice the motor 55 is an alternating current motor hereinafter referred to as the A.-C. motor while the motor 56 is a direct current motor hereinafter referred to as a D.-C. motor. Each of the motors has, respectively, secured to it a pulley 59 and 60 illustrated as of the multiple V belt type and about which is trained a plurality of V belts 61. The V belts 61 are further trained about a pulley 62, which as shown in Fig. 4, is of the multiple V type and is keyed or otherwise secured to a driving shaft 63 which, as will presently be pointed out, leads to the table driving mechanism.

It should be here noted that while the motor 55 and 56 are illustrated as connected through a common belt system with the driving shaft 63 the said motors may be independently belted to the said driving shaft 63 or said motors 55 and 56 may have a common motor shaft with but a single pulley and belt connection with the driving shaft 63. This connection between the motors 55 and 56, further may be in the nature of gears or any other type or kind of mechanical connection so long as each motor may drive the other and at the same time drive the shaft 63 or other element leading to the ultimate translation of the work table or slide.

Associated with one of said motors, the A.-C. motor 55 for example, is a plugging switch which forms part of the control mechanism of the motors as will later be made clear. The plugging switch may be associated with the drive shaft 63 which will be made clear hereinafter.

The plugging switch 64 or "zero speed switch" is well known in industry and is manufactured in various well known forms by electrical manufacturers and it is believed that no structural disclosure or description thereof is necessary. Specifically, however, this switch normally has one moving member, carrying movable contacts and which movable member is connected to the source of mechanical power, such as the shaft of the electric motor or the shaft driven by the motor as pointed out above. The connection between the motor and this movable element or member of the plugging switch is such that upon acceleration the movable member or element is carried along by the motion of the motor until a selected pre-set speed is reached at which point the contact of the movable element engages a stationary contact for completing an electrical circuit and after which slippage occurs between the movable element or member of the plugging switch and the shaft which effects its movement. As the motor decelerates a point in speed is reached at which the plugging switch drops out of contact and assumes its original released position. It is to be understood that this same operation takes place when the shaft is rotated in either direction except that the movable element or member completes a circuit through a different stationary contact in the opposite direction of its movement.

The transverse driving shaft 63 is suitably mounted in anti-friction bearings carried by a sleeve bearing 65 secured to the outer surface of the side housing 36 and projecting thereinto. The said transverse driving shaft 63 is connected through a torque tube or shaft 66 with one end of a worm 67 suitably journaled at its ends in a housing 68 carried by and depending interiorly of the bed 30 as clearly illustrated in Figs. 4 and 5. The worm 67 meshes with a worm wheel 69 keyed or otherwise secured to worm wheel shaft 70 that forms a portion of the longitudinal table drive shaft. The worm wheel 69 is disposed within the housing 68 and has its worm shaft 70 rotatably mounted in anti-friction bearings supported by the said housing 68.

Exteriorly of the housing 68 the worm shaft 70 has connected therewith one end of a torque shaft 71 which has its other end connected to a pinion shaft 72 of the bull wheel gear transmission. The bull wheel gear transmission comprises a pinion 73 on the pinion shaft 72 meshing with a gear 74 splined or otherwise secured to the bull gear worm shaft 75, suitably journaled in anti-friction bearings supplied by the bull wheel supporting housing 76. The worm shaft 75 interiorly of the housing 76, has integral therewith or secured thereto the worm 77 meshing with the bull wheel worm wheel 78. The worm wheel 78 constitutes a portion of the bull wheel which includes laterally of the worm wheel 78, or in flanking arrangement therewith, gears 79 and 80 and which gears 79 and 80 are suitably connected to the worm wheel 78 as to be an integral part thereof, all of which are secured to and carried by a bushing 81 rotatably mounted on a stud 82 journaled in bearings 83 and 84 supplied by the bull wheel housing 76. Each of the bull wheel gears 79 and 80 is, respectively, intermeshed with a rack 79′ and 80′ bolted, pinned, or otherwise secured, to the underside of the table 35 in spaced relation since the bull gear worm wheel 78 is of a larger diameter than the driving gears 79 and 80 and must be accommodated beneath the table.

From the foregoing it will now be appreciated that the A.-C. and D.-C. motors 55 and 56 simultaneously effect the translation of the table 35. It should be noted however that the table 35 is adapted to be actuated at slow and fast speeds with each of said motors playing its part in effecting and controlling the speeds and that the means for effecting and controlling the rotation of the motors is interlocked whereby they supplement one another and which means will be described in detail hereinafter. It should further be noted that the motors 55 and 56 through the said control means will actuate the table through any desired cycle of sequential fast and slow movement between the limits of movement of the table or through any desired cycle of sequential fast and slow movement in the reverse direction all under the control of manually operated pilot or control means.

It is some times desirable to lock the table against inadvertent movement as when a heavy vertical cut or tooling operation is being performed by one or both the side head cutters 42 and 43 or if a cut is being effected by one or both of the cutters 51 on the rail heads 49 and 50. For this purpose use is made of a table clamp or lock which operates on the worm shaft 75 and is clearly illustrated in Figs. 5, 8 and 9. As shown in these figures the worm shaft driving gear 74 is provided with a hub 85 having radially projecting therefrom splines 86 received in key ways in alternate friction locking discs 87. The intermediate friction discs 88 are provided in their outer periphery with key ways receiving splines 89 inwardly, radially, projecting from a housing 90 that encircles and encases the said discs. Within the housing 90 is a coil 91 suitably connected with a source of electric current or electric power under the control of the operator at his operating station which, as will later be pointed out is usually at one or the other side housing 36 and 37 preferably adjacent the side housing 36. The lock housing 90 is provided with an anchoring arm 92 whereby through anchoring bolt 93 the housing is mounted in position on the bed 30. A thrust plate 94 is loosely journaled on the worm shaft 75 and backed by an antifriction thrust bearing 95 which on its other side abuts a nut 96, on the worm shaft 75 and which acts as one abutment for the lock. Within the housing 90 and on the other side of the solenoid 91 is a second anti-friction thrust bearing 97 bearing against a spring backed plate 98 that engages the outermost disc of the group of antifriction discs 87 and 88.

Figures 5, 9:
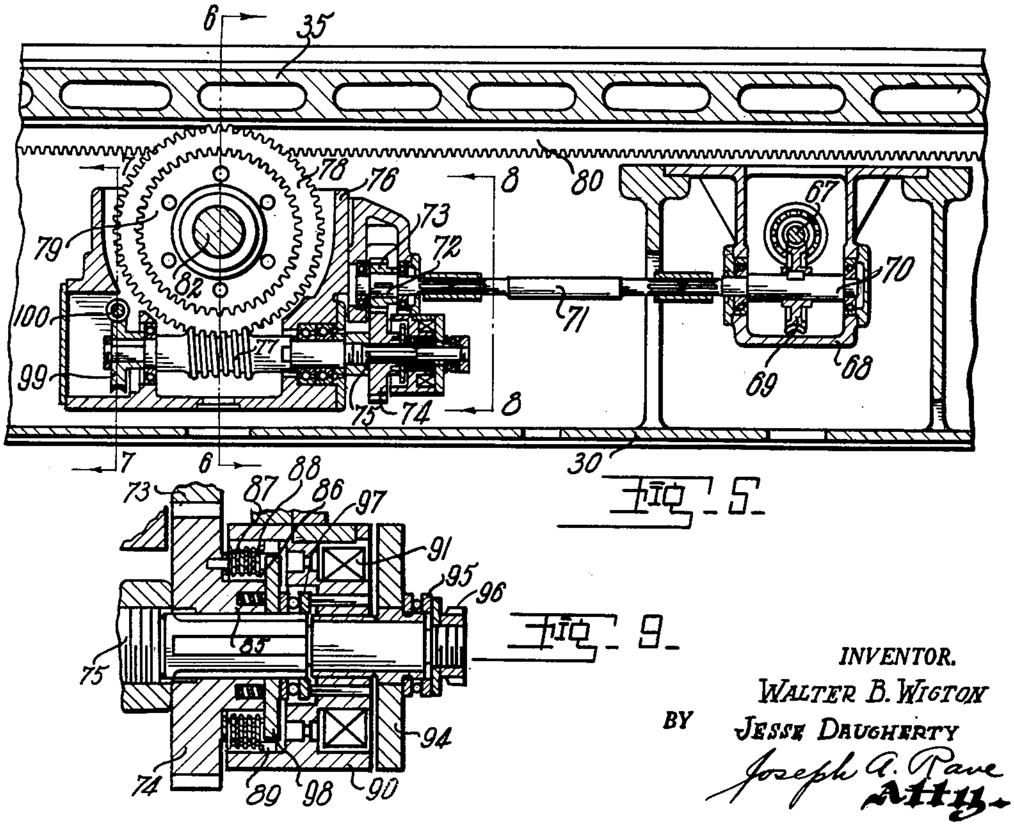
Fig. 5 is a fragmentary longitudinal sectional view through the table drive as seen from line 5—5 on Fig. 4.
Fig. 9 is an enlarged framentary sectional view of certain of the parts of Fig. 5 particularly illustrating the table lock mechanism forming a detail of the invention.

It is believed that the operation of the table lock is well understood since energization of the solenoid 91 will effect an expansion which is resisted by the plate 94 and anti-friction thrust bearing 95 and nut 96, which as noted above, forms one abutment for the lock causing the force of the solenoid to be directed inwardly or toward the left as seen in Figs. 5 and 9 and thereby through the plate 98 causing the friction discs 87 and 88 to engage one another and resist relative movement which is transmitted through the housing 90 to the anchor 93 and therefor the the machine bed 30.

In order to permit the setting up of the machine it is desirable that table 35 be adjustable manually longitudinally of the bed 30. In order to accomplish this the worm shaft 75, beyond its forward bearing, has keyed or otherwise secured thereto a worm wheel 99 with which is meshed a worm 100, see Figs. 5 and 7. The worm 100 has its shaft 101 suitably journaled in bearings provided by the bull wheel housing 76 and said worm shaft 101 has its ends projecting laterally of the said housing 76. Connected to the projected ends of the worm shaft 101, respectively, is a torque shaft 102 which projects beyond the sides of the bed 30 to receive substantially identical adjusting mechanism and it is believed sufficient if but one of said mechanisms be described in detail.

Accordingly, and with reference to Fig. 7 the shaft 102 has its outer end journaled in a bearing provided by a housing 103 secured to and projecting outwardly of the bed 30. Mounted on the outer end of the shaft 102 is a pinion 104 which has its face slightly tapered and which pinion acts as a rachet wheel. Mounted on the pinion for oscillation about the axis thereof is a hub 105 provided with a boss 106 in which is threaded one end of a tube 107. Interiorly of the tube 107 is an axially movable rod 108 having its inner end reduced to form a pawl 109 for engaging the teeth of the pinion 104. The upper end of the reciprocating rod 108 has pinnned or otherwise secured to it a knob 110 which forms one abutment for a spring 111 surrounding the rod 108 and which spring 111 occupies a counterbore in the tube 107 and abuts on its other end on the base of the counterbore. The operation of this mechanism is as follows:

When it is desired to rotate the worm 100 the operator grasps the outer end of the tube 107 and depressing the rod 108 within said tube engages its pawl 109 with the ratchet teeth of the pinion 104 whereupon movement in one or the other direction will accordingly rotate the shaft 102 and worm 100. It is of course understood that the actual movement of the tube 107 is through a part of a revolution whereupon the knob is released to permit retraction of the pawl 109 and a return of the tube to its normal position and if further movement of the table is desired the said rod 108 is again depressed and the additional moving accomplished by arcuately actuating the tube 107. The actual movement of the table 25 is effected by rotating the worm wheel 99 through the worm 100 which in turn rotates the bull wheel worm 77 for rotating the bull wheel worm wheel 78 and the bull wheel gears 79 and 80 secured thereto.

The prime mover or power plant for actuating the side heads 40 and 41, the rail 46 and rail heads 49 and 50 is substantially identical with that for translating the table and as shown in Figs. 10 and 11 comprises an A.-C. motor 112 and a D.-C. motor 113 each having associated therewith, respectively, a pulley 114 and 115 which are illustrated as of the multiply V groove type with a plurality of V belts 116 trained about them. The belts 116 are in turn trained about a pulley 117 secured to the initial drive or worm shaft 118.

As was pointed out in connection with the table translating motors 55 and 56 said motors may have an independent belt connection with the initial drive shaft 118 or the said motors 112 and 113 may be independently geared to said shaft or connected therewith through a common gear train or said motors may have a common motor shaft to be rotated by said motors independently and rotated by said motors simultaneously. The motors 112 and 113 similar to the table control motors 55 and 56 have associated therewith a plugging switch to be driven thereby or, as pointed out above, driven through some other agency at the same speed as said motors and at the same time. As shown in Figs. 10 and 11, the plugging switch 119 is connected through its shaft 120 with the intial driving shaft 118. Any suitable or desirable means may be employed for supporting the motors 112 and 113 such as the side housings connecting member or arch 38 and the plugging switch accordingly properly supported as by a bracket 121 projecting from the housing 122 that houses the driven mechanism from the initial drive shaft 118.

The drive shaft 118 is suitably journaled in anti-friction bearings supplied by the housing 122 and has integral therewith, or secured thereto, intermediate its ends, a worm 123 which meshes with a worm wheel 124 integral with or secured to a sleeve 125 loosely journaled on horizontal side heads and rail head driving shaft 128. Integral with or secured to one end of the sleeve 125 and exteriorly of the housing 122 is one member 126 of a clutch mechanism indicated in general by the reference numeral 127. Splined to the driving shaft 128 is the other clutch member 129 having between them the clutch or friction discs 130. The discs 130 are held in frictional driving relation by springs 131 which abut on opposite ends with plates 132 and 133 to thereby effect a connection between the driven worm sleeve 125 and the heads translating shaft 128. It should here be noted that the clutch 127 is a safety clutch to prevent inadvertent damage to the side heads and rail.

The shaft 128 is illustrated as comprising a central portion 134 on which is freely rotatable the driving sleeve 125 coupled through a coupling 135 with the shaft 128 and it should be here noted that a similar shaft 128 extends from the other side of shaft central portion 134 and connected therewith but that these shafts may be a single element if desired since it is only necessary to transmit motion from the driving sleeve 125 to the horizontal driving shaft 128. Each of shaft sections 128 carries at its outer end a beveled gear 136 which is keyed or otherwise secured thereto with said beveled gears enclosed in a housing 137 secured to and carried by the upper end of the respective side housings 36 and 37. The housing 137 provides suitable bearings for the end of the shaft 128 here shown again as a separate section 138 connected to the portion 128 through a coupling sleeve 139 although it may be integral therewith.

The bevel gear 136 meshes with a companion bevel gear keyed or otherwise secured to the upper end of an intermediate shaft 140 and said intermediate shaft 140 has keyed or otherwise secured thereto at its other end a pinion 141 meshing with a gear 142 at the upper end of a vertical spline shaft 143. The spline shaft 143 has its upper end suitably journaled in the housing 137 and has its lower end journaled in a bracket 144 at the lower end of the side houssing 36. The spline shaft 143 is utilized to obtain movement of the rail heads 49 and 50 longitudinally of the rail 46 and for this reason there is but one spline shaft 143 although the intermediate shaft 140 and gears thereon together with the gear 142 is provided at each of the side housings, the gear 142 being utilized merely as a connecting gear or idler gear as will later be made clear, at the second side housing.

The gear or pinion 142 at the upper end of spline shaft 143 meshes with a gear or pinion 145 loosely rotated on the upper end of an elevating screw 146. The upper face of the gear 145 is provided with clutch teeth intermeshing with cooperating clutch teeth at the lower end of a clutch housing 147 shown as a cup shaped member containing friction discs 148 alternate ones of which are keyed to the clutch member 147. Keyed or otherwise secured to the elevating screw 146 is clutch hub 149 having keyed thereto the remaining or intermediate discs 148. A clutch applying plate 150 is provided in relation to the elevating screw 146 for effecting and maintaining a driving connection between the clutch hub 149 and clutch housing 147 through the clutch discs 148. As illustrated in the drawings actuation of the plate 150 is through an electric solenoid 151 operatively associated with the clutch plate 150 and preferably mounted on the upper end of the elevating screw 146 and disposed within the housing 147.

Since this clutch forms no part of the invention except as a means for connecting and disconnecting the elevating screw 146 with the driving shaft 128 further specific description thereof is deemed unnecessary. Suffice it to say that the clutch is operable through an electric push button or other pilot device from the operators station as will later be made clear.

The elevating screw 146 has threaded thereon one or more sleeve nuts 152 which are carried by a lug 153 projecting from the base 154 of each side head 40 and 41.

It should be noted that there is an elevating screw 146 exteriorly and vertically of each side housing 36 and 37 respectively for the side heads 40 and 41 thereof that for the side head 40 and exteriorly of the housing side 36 is the only one illustrated in the drawing and is illustrated in Fig. 13. It is in connection with the elevating screw for the side head 41 that the gear 142 is used merely as an idler gear as referred to above.

From the foregoing it will now be understood that rotation of the drive shaft 128 will rotate the elevating screws 146 for elevating the side heads.

The spline shaft 143 has keyed or otherwise mounted thereon, for sliding movement relative thereto, a bevel pinion 155 which has a sleeve 156 rotatably journaled in a boss 157 integral with a bracket 158 bolted or otherwise secured to the rear surface of the rail 46 on that portion thereof which projects laterally of the side housing 36. Meshing with the bevel pinion 155 is a bevel gear 159 keyed or otherwise secured to one end of a shaft 160 which has one end thereof rotatably journaled in the bracket 158. The shaft 160 projects longitudinally of the rail 46 into a gear box 161 secured to the end of the rail 46 and projecting laterally outwardly thereof, the shaft 160 having its other end journaled in said gear box 161. The gear box 161 contains the gears and clutch mechanism for selectively connecting shaft 143 with the heads 49 and 50 to effect their translation as well as to effect the vertical feed of the spindle 51 of said heads as will presently be made clear.

Within gear box 161 the shaft 160 has keyed or otherwise secured thereto pinions 162 and 163 the former effecting the actuation of the heads 49 and 50 in one direction while the latter effects said actuation in the reverse direction. Accordingly the pinion 163 meshes with a pinion 164 loosely journaled on intermediate shaft 165 carried by the gear box 161.

Mounted in the gear box 161 is a second intermediate shaft 166 on which is loosely journaled gears 167 and 168. The gear 168 is meshed with the pinion 162 on the shaft 160 while the gear 167 meshes with the intermediate or reverse motion gear 164 on the intermediate shaft 165, and as seen in Fig. 15, the pinion 164 is of sufficient width to simultaneously mesh with the driving pinion 163 and driven gear 167.

Figures 17, 18, 20, 21:
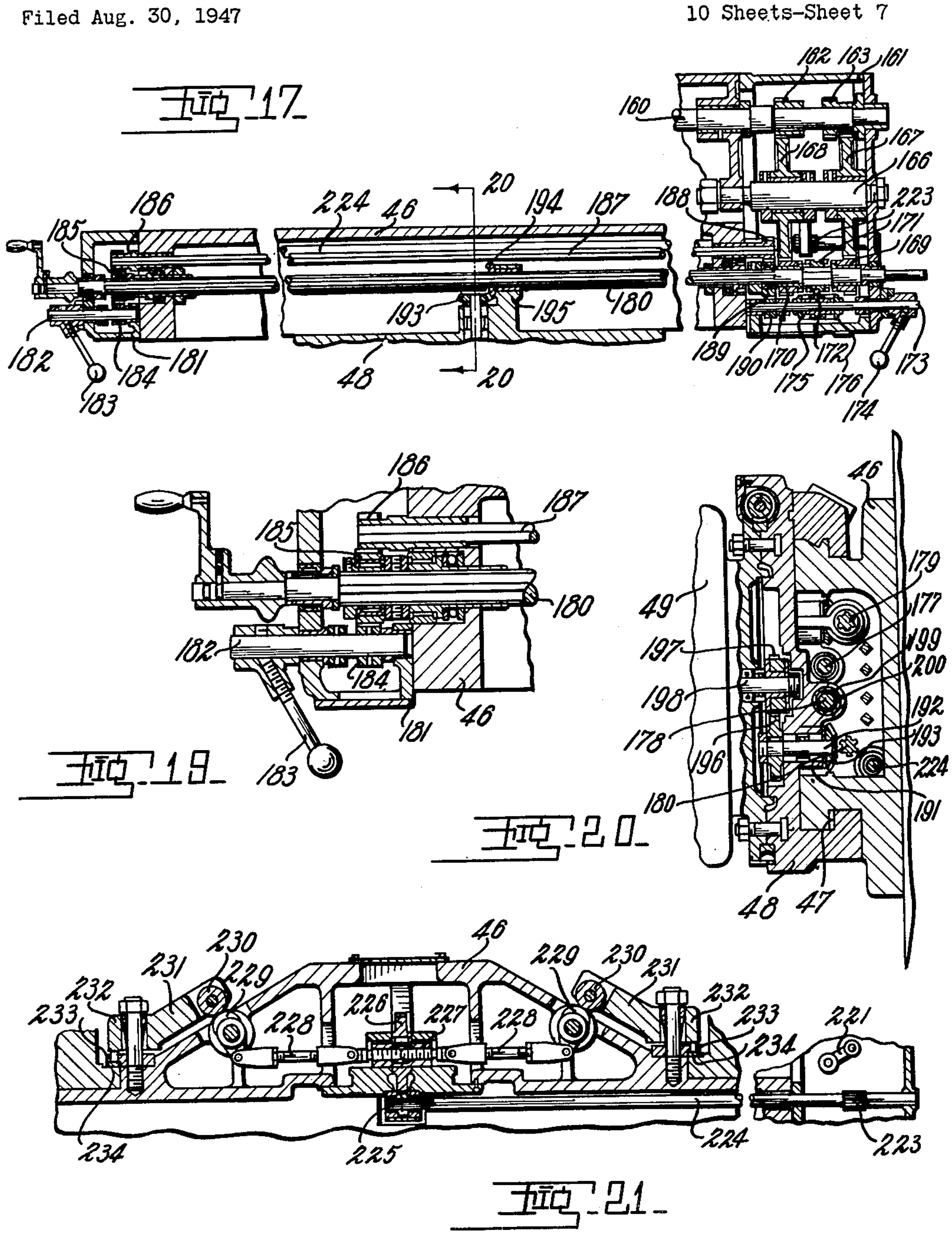
Fig. 17 is a horizontal sectional view through the rail of the machine on line 17—17 on Fig. 16.
Fig. 20 is a transverse sectional view through the rail and illustrating the connection of the shaft of the rail with the rail heads.
Fig. 21 is a transverse sectional view through the rail and illustrating particularly the clamp mechanism thereof, taken on line 21—21 on Fig. 16.

The rail 46 is substantially channel shaped for the major portion of its length and through which extends the driving means for the rail heads 49 and 50, above referred to. Each head has connected therewith a translating screw for effecting slow or feed movement and rapid transverse movement in reverse directions for its head, as well as a spline shaft for effecting the axial movement of the rail head spindles. Each of the said rail heads translating screws and spline shafts receive its power in one direction from the gear 168 and in the other direction from the gear 167. Accordingly, as shown in Fig. 17, each rail head screw and spline shaft has loosely journaled thereon a pinion 169 enmeshed with the gear 167 and a second pinion 170 enmeshed with the gear 168. The inner ends of pinions 169 and 170 are each provided with clutch teeth adapted to be engaged by complementary clutch teeth at opposite ends of a clutch sleeve 171. The clutch sleeve 171 is provided, substantially centrally thereof, with a circumferential groove receiving clutch sleeve shifter fork 172. The clutch sleeve shifter fork 172 is mounted, against rotative or oscillative movement on an oscillatable rod or shaft 173 that projects beyond one end of the gear box or housing 161 to have secured thereto a lever 174. Through suitable cam means at opposite ends of the clutch sleeve shifter fork 172, and carried by cams 175 and 176 on the oscillatable shaft or rod 173, the said shifter fork 172 is actuated to the right or left as seen in Fig. 17, depending upon whether the shifter lever 174 is oscilated upwardly or downwardly from the position disclosed in Fig. 17.

Figures 12, 15, 16:
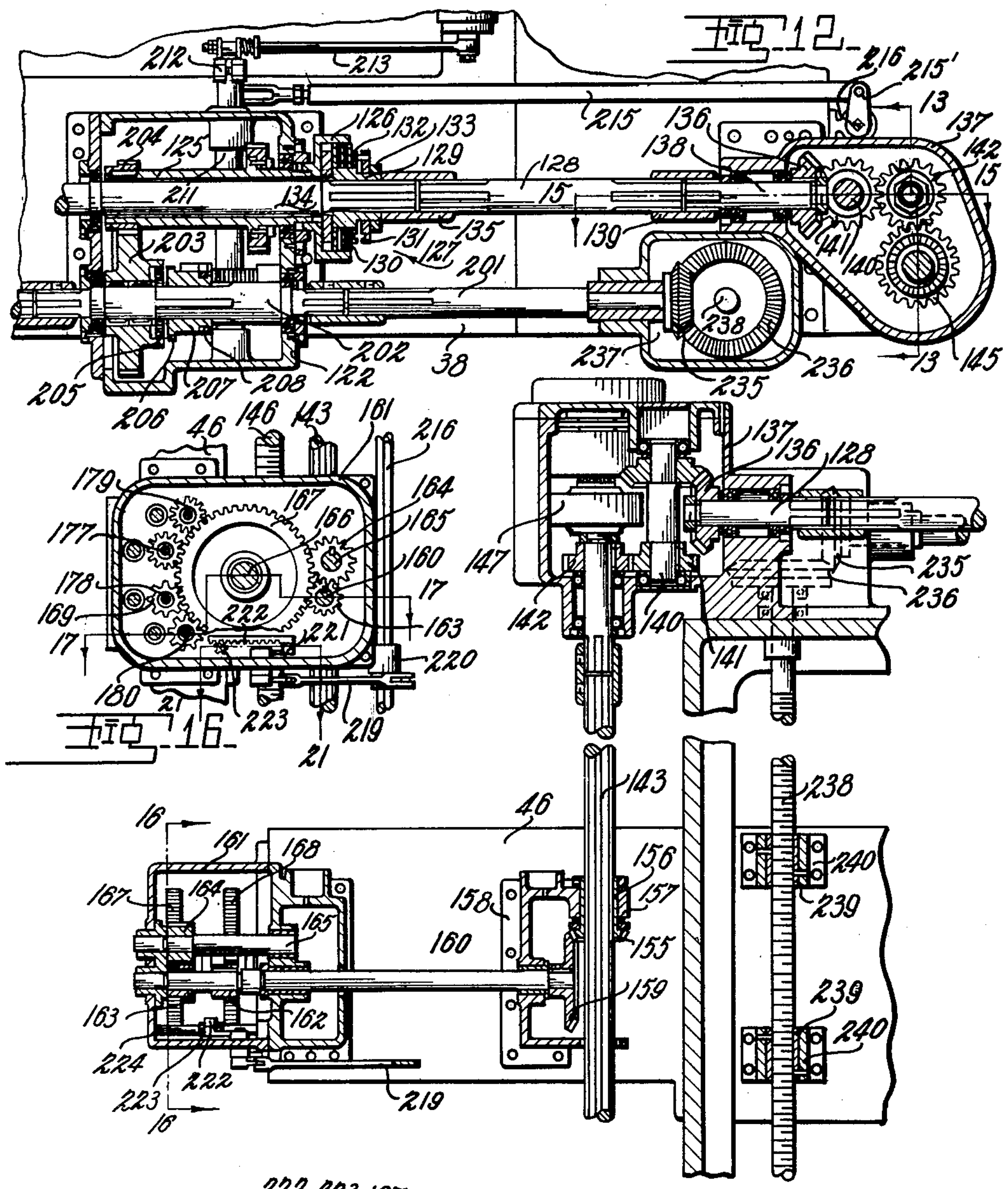
Fig. 12 is a horizontal sectional view through the driving mechanism to the heads and rail translating means, taken on line 12—12 on Fig. 11.
Fig. 15 is a fragmentary vertical sectional view through the means for translating the rail heads as seen from line 15—15 on Fig. 12.
Fig. 16 is a view partly in section and partly in elevation as seen from line 16—16 on the end of the rail on Fig. 15.
Figure 18:
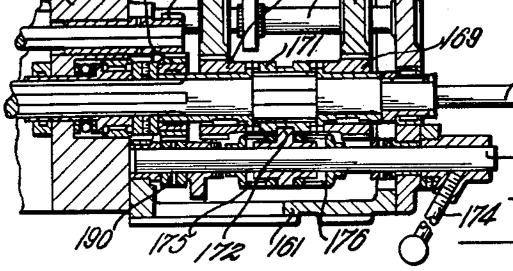
Fig. 18 is an enlarged sectional view through certain portions of Fig. 17 and illustrating the reversing clutch to the rail feeding and translating means for the heads thereon.

As illustrated in Fig. 16 the reference numerals 177 and 178 indicate translating lead screws while the reference numerals 179 and 180 indicate spline shafts with lead screw 177 and spline shaft 179, for example, controlling the operation of the rail head 50, while the lead screw 178 and shaft 180 control the operation of the rail head 49. As was noted above each of said lead screws and spline shafts is gear connected through similar pinions 169 and 170 with the gears 167 and 168 with said pinions 169 and 170 being connected with its screw or spline shaft through a clutch and clutch shifting mechanism each under the control of a shift lever 174 as illustrated in Fig. 1.

The said clutch sleeves 171 may be actuated from the opposite end of the rail for which purpose the rail, see Fig. 19, is provided with a housing 181 in which is oscillatably journaled a rod or shaft 182 having secured thereto a lever 183. Keyed or otherwise secured to the lever 183 is a segmental gear 184 meshing with a pinion 185 freely rotatable on the far end of the screw or spline shaft which it controls. The gear 185 meshes with a pinion 186 keyed or otherwise secured to a bar or rod 187 extending the length of the rail 46 and along the inner face of the rail channel and having its other end projecting into the gear box 161. Within the gear box 161 the rod or shaft 187 has keyed or otherwise secured to it a pinion 188 which meshes with a gear 189 on the forward end of the screw or spline shaft it is controlling. The said gear 189, in turn, meshes with a segmental gear 190, similar to the segmental gear 184, pinned or otherwise secured to the oscillatable rod 173.

It will be understood that there is a clutch shifting lever 183 and mechanism as just described for each of the lead screws and shafts extending longitudinally of the rail whereby the clutch sleeve shifter 172 of each screw and spline shaft may be controlled from the remote end of the rail.

As illustrated in Figs. 17 and 20 each of the rail heads 49 and 50 is provided with a plate or saddle 48 which has projecting rearwardly therefrom into rail channel a boss 191 having journaled therein a short shaft 192. The shaft 192 is provided on its end within the rail channel with a bevel gear 193 which meshes with a complementary bevel gear 194 rotatably mounted in a boss 195 projecting from the head saddle 48 and preferably projecting rearwardly from the saddle boss 191. The gear 194 has a spline connection with its spline shaft, 180 for example. The outer end of the saddle shaft 192 has keyed or otherwise secured to it a spur gear 196 meshing with a gear 197 on the inner end of a spindle feed shaft 198. From the foregoing, it will be understood, that rotation of spline shaft 180 will axially feed the spindle 151 of the rail head 49 and it should be noted that the spline shaft 179 will correspondingly actuate the spindle 51 of the rail head 50.

In order to translate the rail heads, the head plate or saddle 48 has projecting rearwardly thereof, into the channel of the rail, a second boss 199 in which is secured a sleeve nut 200 threaded onto, in the case of the railhead 49, the rail lead screw 178. A similar arrangement from the rail head plate or saddle of the rail head 50 is connected with the lead screw 177.

From the foregoing it will now be understood that the rail heads 49 and 50 may be independently actuated relative to the rail in reverse direction and that the spindles of said heads may likewise be independently actuated. The said power for actuating the said heads and spindles is obtained from the vertical spline shaft 143. It will also be appreciated, as pointed out above, that the side heads 40 and 41 are elevated through the vertical elevating or lead screw 146 there being one screw for each side head located, respectively, exteriorly of the side housing on which the heads are mounted.

It should be noted at this time that the rotation of the power plant or motors 112 and 113 in one direction effects the upward movement of the side heads and the outward movement of the rail heads if the said rail heads are connected to the spline shaft and the side heads elevating screws connected with the horizontal drive shaft and for convenience in further explaining the invention, this movement corresponds to a normally forward movement of the motors and which, for convenience may be termed an up and out movement. Reverse rotation of the motors 112 and 113 will cause a reverse actuation of the side heads and rail heads, namely, a downward movement and an inward movement respectively. For convenience in further describing the invention this reverse rotation of the motors 112 and 113 will be referred to as a down and in movement. It should be noted however that this nomenclature is not to be construed as limiting the invention but merely as a convenient way of describing the operation of the machine.

As illustrated in Figs. 10, 11 and 12 use is made of a second horizontal driving shaft 201 which like the driving shaft 128 is formed of sections including a central section 202 to the ends of which the main portions 201 of said driving shaft are connected through suitable connecting sleeves. The central section 202 has its ends journaled in suitable anti-friction bearings provided by the housing 122 and interiorly of the housing 122 the shaft section 202 has loosely rotatable thereon a gear 203 meshing with a pinion 204 keyed or otherwise secured to one end of driving sleeve 125. The gear 203 is provided with clutch teeth, shown as an internal gear 205, adapted to be engaged by complementary clutch teeth, shown as a spur gear 206, on one end of clutch element 207 splined on and axially movable relative to the driving shaft central section 202. The clutch element 207 is provided with a circumferential groove for a clutch shifter fork 208 which is integral with, or secured to, one end of clutch element shifter rod 209. The clutch shifter rod 209 has integral therewith, or secured thereto, a rack meshing with rack pinion 210 on a rotatable rod 211 mounted for rotative movement in the housing 122. The rod 211 projects beyond one end of the housing 122 to have secured thereto a lever 212 connected by a link 213 with a motor 214 mounted on the side housing connecting member or arch 38.

The lever 212 is further connected by a link 215 to one end of an arm 215′ secured to the upper end of a rod 216 that extends vertically, exteriorly of the housing 36. The rod 216 has its opposite ends rotatably journaled in bearing members 217 and 218 carried by the side housing 36 and is provided, for sliding movement thereon, with an arm 219 rotatably mounted in a bracket 220 extending from the outwardly projecting portion of the rail 46 so that said arm 219 moves vertically of the rod 216 with the rail. As seen in Fig. 16 the arm 219 has connected therewith one end of a link 220, the other end of which operates a crank 221 connected, in turn, to one end of a rack bar 222. The rack bar 222 meshes with a rack pinion 223 on one end of a rotatable rod 224, see Fig. 21. The rod 224 has its other end keyed or otherwise secured to a pinion 225 enmeshed with a gear 226 that operates rail clamping mechanism. The gear 226 is adapted to rotate a nut 227 having right and left hand threads at opposite ends thereof each of which operates a similar clamping device that may be of the form to be presently described or of any other suitable or desirable form.

The rail clamp device comprises a link 228 adapted to be axially shifted by the nut 227 for thereby oscillating an eccentric cam 229 which through a roller 230 actuates a clamping arm 231 to cause the end 232 thereof to impinge through clamping pins 233 on a lip 234 extending longitudinally of the inner side of the side housings 36, and 37.

From the foregoing it should be noted that actuation of the motor 214 through the link 213 oscillates the lever 212 for thereby axially shifting the link 215 and simultaneously rotating rack shaft 211. The parts are so arranged that the link 215 through the arms 215′ and 219 shifts the rack bar 222 which, through the rod 224, releases the clamp arm 231 prior to the effective engagement of clutch member 207 with the gear 203 for a purpose that will presently be described. Conversely the clutch 207 is disengaged from the gear 205 before the link 214, through the mechanism just described actuates the clamp arm 231 for clamping the rail to the side housings.

The horizontal driving shaft 201 is duplicated, as intimated above, from each end of its intermediate section 202 for actuating a pair of rail elevating screws, only one of which has been illustrated and will be described in detail which is deemed sufficient for both. Accordingly, the shaft 201 has keyed or otherwise secured to its end a bevel pinion 235 meshing with a complementary bevel gear 236 with said gears enclosed within a suitable housing 237 secured to and carried by the side housing 36. The side housing 36 between its vertical guides 39 is substantially channel shaped and it is in this channel that the rail elevating screw 238 is disposed and has its upper end within the housing 237 to have keyed or otherwise secured thereto the bevel gear 236. The elevating screw 238 has threaded thereon one or more sleeve nuts 239 each of which is carried by a bracket 240 and held against rotation relative to its bracket. The bracket 240 is integral with and projects rearwardly from the rail into the vertical channel thereof.

From the foregoing it will be noted that the rail 46 is elevated independently of the side heads and at the same time may be elevated from the power plant including the motors 112 and 113 and that for further disclosure of the invention the movement imparted thereto will be designated as an up or down movement, the former being effected when said motors 112 and 113 are rotating in a forward direction while the latter movement will be effected when the motors are rotating in a reverse direction.

From the foregoing it will be noted that the motors 55 and 56 effected the translation of the table 35 at relatively low feed speeds and at relatively high traverse speeds without the use of any speed variating mechanisms such as change gears, sliding gears, differentials, speed reducers or clutches for connecting in or disconnecting out of the transmission any of these devices. The variation in slow speeds or the movement of the table 35 at feeding rates is accomplished through the motor 56 which, as noted above, is a direct current motor capable of being operated between minimum and maximum speeds for thereby varying the rate of rotation of its pulley 61 to obtain a movement of the table at feeding rates of from one inch to sixty inches per minute or more. The motor 55, as noted above, is ordinarily an alternating current motor of constant speed which effects the traverse movement of the table at approximately two hundred and forty inches per minute. The D.-C. motor 56 is used exclusively for obtaining the feed rates to the table while the two motors 55 and 56 are employed to bring the table traverse speed to its maximum in a minimum of time whereupon the A.-C. motor 55 takes over to effect the actual translation of the table 35 at its maximum traverse speed all as will be more clearly pointed out hereinafter.

The movement of the side heads 40 and 41, the rail 46 and rail heads 49 and 50 is obtained from the other set of motors 112 and 113 with said side heads and rail movable vertically at feeding rates of one inch to sixty inches per minute or more while the rail heads are adapted to be similarly translated on the rail inwardly toward one another and outwardly from one another at slow feed rates of one inch to sixty inches or more per minute. This feeding movement of these heads and rail being obtained exclusively from the adjustable D.-C. motor 113 while the said side heads, rail and rail heads are adapted to be actuated at traverse speeds of two hundred and forty inches per minute and the said traverse speed being initiated through the combined efforts of both motors 112 and 113 until the speed of the D.-C. motor 113 is reached whereupon the A.-C. motor effects the maximum traverse of these parts.

The motors 55, 56, 112 and 113 are under control of the operator through push buttons or through pilot devices located at the operating station or stations of the operator which is generally at the forward face of the side housings 36 and 37 or is arranged whereby the said push buttons or pilot devices are available to be operated at any point traversely of the machine bed and table in front of the side housings 36 and 37 and therefore in front of the side and rail heads. This type of a control device is known as a pendent station controlled mechanism and is the one illustrated in the drawings and will now be described.

As shown in Figs. 1 and 22 the pendent control station comprises a box like housing 241 at the end of the U-shaped frame comprising a vertical leg 242 attached to the housing 241 and conveniently in the form of a pipe to contain the lead wires from the push buttons or other pilot control devices. Secured to the vertical arm 242 is a base portion 243 terminating in a second depending arm 244 which leads to the usual panel, cabinet, or other housing, for the electrical control mechanism to be subsequently described and it is generally exteriorly of the machine and not physically illustrated in the drawings. The pendent station control mechanism frame 242, 243, and 244 is attached to the machine through a standard 245 which may be secured to and upstands from the side housings connecting member or arch 38 with a swinging joint 246 between these parts so that the pendent box 241 may be, as noted above, swung transversely of the machine bed and table to either side thereof for convenient operation by the operator.

The pendent station 241 as seen in Fig. 22 is, specifically, provided with a plurality of buttons for switches and which will be identified by reference numerals hereinafter in the description of the electrical magnetic control circuits which effect and control the rotation of the table feed and traverse motors and the heads and rail feed and traverse motors. It should be noted however that the table magnetic lock is under control of a push button 247 which is operated when it is desired to lock the said table against movement when, as noted above, a heavy cut is being effected by the side or rail heads in an upward direction. The magnetic clutch for connecting the motors 112 and 113 with the side heads elevating screws 146 is under the control of a push button 248. The clutch shifting and rail clamping and unclamping motor 214 is likewise under the control of push buttons 249 and 250 so that the said rail may be released prior to the elevation of the rail.

The remaining push buttons carried by the pendent station control box 241 controls pumps, motors, and the like, which are necessary equipment in a machine tool such as the lubricating pump motors for the force feed lubricating system, the side heads motors 44, the rail heads motors 53, and a coolant pump, when such a device is utilized on the machine tool and all of which mechanisms are well known and form no part of the present invention except to provide a complete machine tool.

Figure 23:
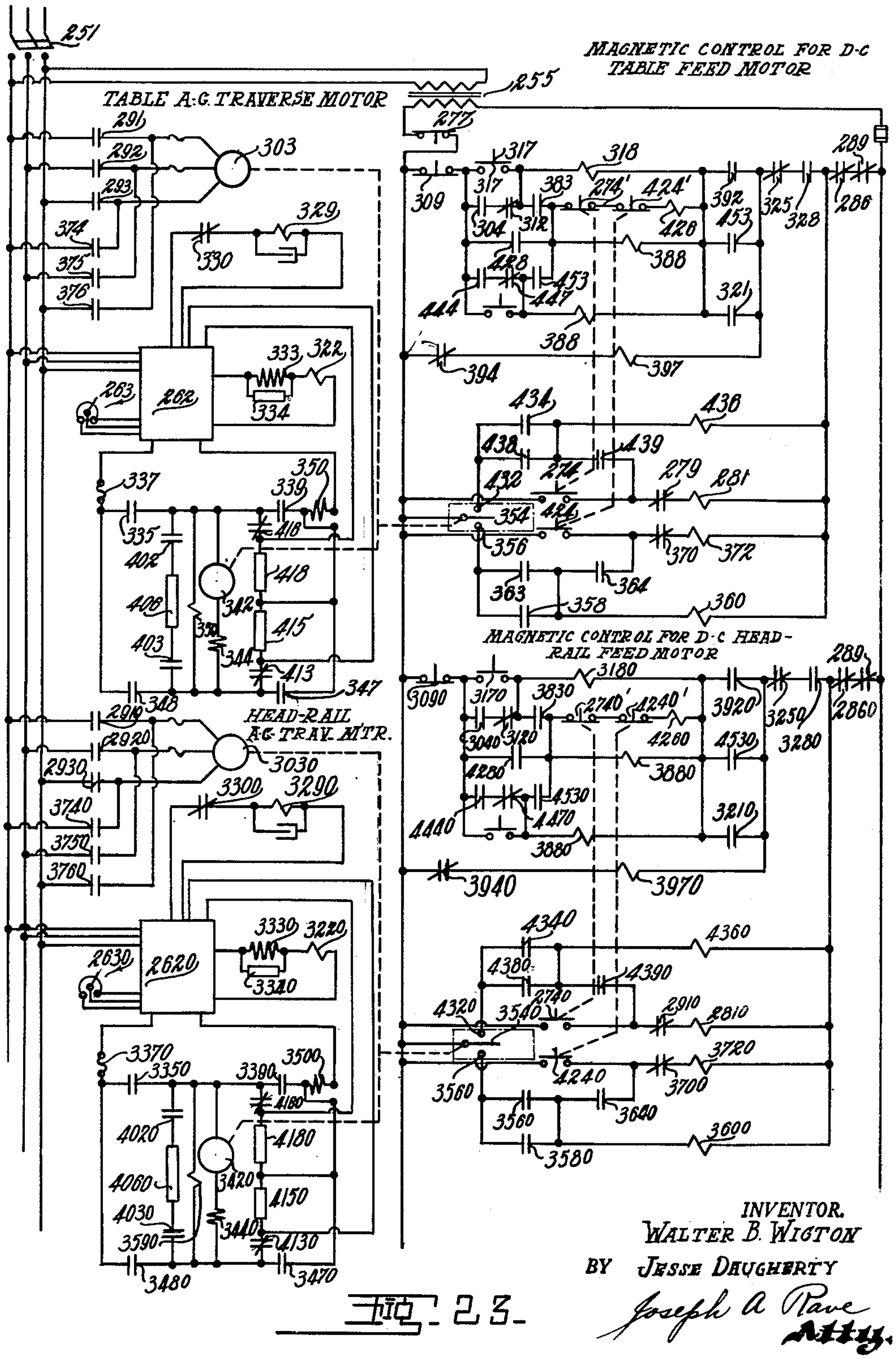
Fig. 23 is a wiring diagram of the electrical circuits controlled by the pilot devices of Fig. 22.
Figure 24:
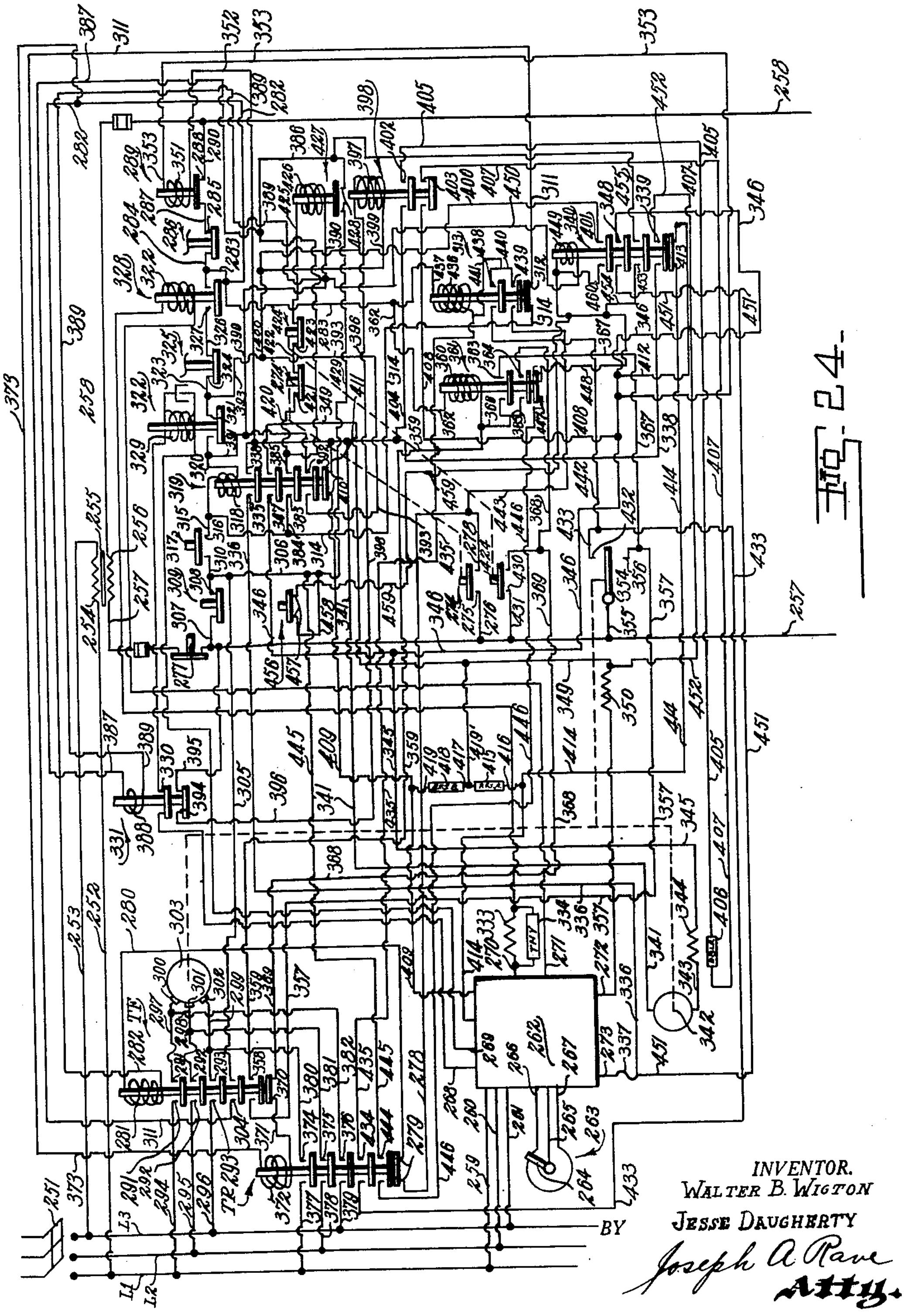
Fig. 24 is a semi-schematic diagram of the control mechanism for the power plant of the table.
Figure 25:
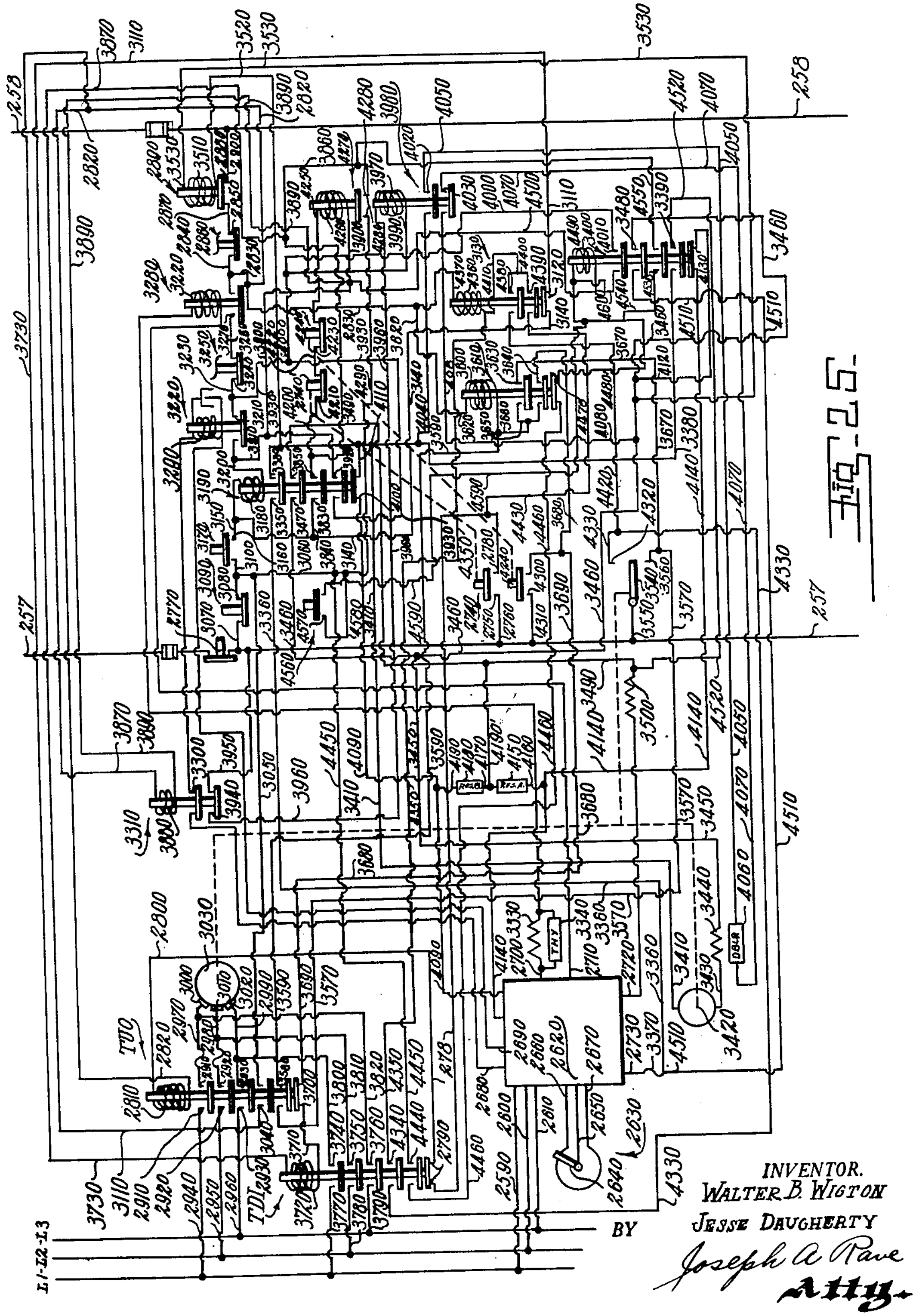
Fig. 25 is a schematic diagram, similar to Fig. 24 of the electric control mechanism for controlling the power plant for the heads and rail.

In Fig. 23 there is illustrated the electrical diagram as employed in wiring or connecting the various motors to one another and to the control and safety devices therefor. In Figs. 24 and 25 the same circuits are illustrated in a semi-pictorial diagrammatic fashion and the circuits will be described in connection with the illustration in Fig. 24 with appropriate reference and tie-ins to the diagram in Fig. 23. Since the control to the heads and rail motors 112 and 113 is substantially identical with the control and wiring of the table motors 55 and 56 the same description for Fig. 25 may be employed for Fig. 24 with the reference characters in Fig. 25 having added thereto a similar digit, namely a "0."

The wiring for the table actuating power plant and the magnetic and electronic control circuits and mechanism therefor is illustrated on Fig. 24. The electric power supply has therein a main control switch 251 for connecting the said current power with wires L1, L2 and L3. This electric power supply is of one or more phase, and supplied by a power plant, the closing of the said main switch makes the power available in lines or wires L1, L2 and L3 and which power in lines L1, and L3 is connected by wires 252 and 253, respectively, with the opposite ends of a voltage step down transformer coil 254 of a transformer 255. The transformer 255 transforms and steps down the higher voltages in coil 254 into relatively lower voltage available from the transformer low voltage coil 256 which flows into the main lines or wires 257 and 258, respectively, from the ends of said transformer low voltage coil 256 of the magnetic control circuit.

Also extending from wires L1, L2 and L3 are wires 259, 260 and 261 which terminate in an electronic controller 262 which controls the table feed motor which as above noted is a D.-C. motor. The electronic controller is a commercial product containing control elements and transformers for producing rectified direct current to operate the D.-C. motor at speeds that are adjustable and the electronic controller produces voltage for certain of the control mechanism. It is not deemed necessary to give details of the circuits of the electronic controller 262 but it should be noted that control circuits are available from the electronic controller and that the voltage from the controller is adjustable through a potentiometer, diagrammatically illustrated and identified in its entirety by the reference numeral 263. The potentiometer 263, as diagrammatically illustrated, includes an adjustable arm 264 connected with the electronic controller 262 by a wire 265 while the ends of the potentiometer resistance are, respectively, connected with the controller by wires 266 and 267.

The electronic controller 262 utilized in the present exemplification of the invention is of a type made by a number of electrical equipment manufacturers, for example, that made by The General Electric Company, is known as a "Thymotrol," that made by Westinghouse Electric Corporation is known as a "Mototrol" and that made by the Cutler Hammer, Inc. is known as an "Ultraflex," to mention only a few of the controllers available on the market.

Extending from the electronic controller 262 are wires 268 and 269 for controlling the operation of a part of the magnetic control mechanism, while, further, extending from the electronic controller 262 are wires 270 and 271 for supplying rectified direct current to the D.-C. motor shunt field, and wires 272 and 273 from the electronic controller for supplying rectified direct current for the D.-C. motor series field as well as for supplying direct current for the D.-C. motor armature and commutator field all as will be further described hereinafter.

Assuming now that the motors are quiet, not running, and the main switch 251 is closed, the transformer 255 is energized, as is the electronic controller 262 for thereby respectively supplying current in lines 257 and 258 for the main magnetic control circuit, and in lines 268 and 269 for the supplemental magnetic control circuit, in lines 270 and 271 of the direct current D.-C. motor shunt field and in lines 272 and 273 for the D.-C. motor armature, commutator field, and series field. The machine is now ready to be operated and the circuit and power flow will be described in connection with a typical machining cycle.

Assuming that it is desired to rapidly advance the work and tool to one another, preparatory to effecting a tooling operation, the operator would then press or close normally open forward traverse button or switch 274 for completing an electric circuit and would at the same time open a supplemental, normally closed, traverse forward button or switch 274' mechanically connected therewith but located in the D.-C. motor feed control circuit as will later be made clear. The forward traverse button or switch 274 has one side of its contacts 275 connected by a wire 276 with the magnetic control circuit wire 257 behind a normally closed stop switch 277. The other side of the contacts 275 is connected by a wire 278 with one side of contacts of normally closed contacts 279 of A.-C. motor reversing switch, indicated in its entirety by the reference character TR, and which normally closed contacts 279 has its other side connected by a wire 280 with one end of a solenoid coil 281 that controls the A.-C. motor forward switch, indicated in its entirety by the reference character TF. The said solenoid coil 281 has its other end connected by a wire 282 to a supplemental main lead wire 283 of the magnetic control circuit that, in turn, connects with a wire 284 connected to one side of A.-C. motor overload element contact 285 of A.-C. motor overload 286, wire 287 to one side of contacts 288 of counterelectromotive force relay 289 (C. E. M. F.) and wire 290 to the other main lead or wire 258 of the magnetic control circuit and thus complete the circuit for actuating the A.-C. motor forward switch TF.

The actuation of the A.-C. motor forward switch TF closes normally open contacts 291, 292 and 293 thereby connecting main power lines or wires $L_1$, $L_2$ and $L_3$ respectively, through wires 294, 295, and 296, respectively, with wires 297, 298 and 299 that, respectively terminate at terminals 300, 301 and 302 of A.-C. motor winding 303. Simultaneously the A.-C. motor forward switch TF normally open contacts 304 are closed which have one side thereof connected by a wire 305 with a supplemental main lead or wire 306 of the magnetic control circuit that extends from the magnetic control circuit main lead or wire 257 through a wire 307, connected to one side of contacts 308 of D.-C. motor normally closed feed stop button or switch 309 and a wire 310 connected to the other side of the contacts 308 of feed stop button or switch 309 and with which wire 310 the said supplemental main magnetic control circuit lead or wire 306 connects. The A.-C. motor forward switch contacts 304 have their other side connected by a wire 311 to one side of the normally closed contacts 312 of a plugging switch reverse relay 313. The other side of the contacts 312 have connected therewith one end of a wire 314 which has its other end connected to a wire 315 extending from one side of normally open contacts 316 of D.-C. motor feed forward switch or push button 317. The other end of the wire 315 is connected to one end of a solenoid coil 318 which closes a multi-contact switch 319 that operates and controls the rotation of the D.-C. motor in a forward direction. The circuit beyond the solenoid coil 318 includes a wire 320, normally open now closed contacts 321 of an A.-C. motor control relay 322, a wire 323, normally closed contacts 324 of D.-C. motor overload 325, a wire 326, normally open now closed contacts 327 of a field loss relay 328 to wire 284 and electrical safety devices above pointed out and including normally closed contacts 385 of overload 286, wire 287, normally closed contacts 288 of C. E. M. F. relay 289 and wire 290 to the main lead or wire 258 of the magnetic control circuit. It should be here noted that the normally open contacts 321 of control relay 322 were closed when the main switch 251 was closed due to the fact that the said control relay 322 has the ends of its solenoid coil 329 connected respectively to the wires 268 and 269 and the electronic controller 262. The circuit including the wires 268 and 269 and solenoid coil 329 is completed through the normally closed contacts 330 of D.-C. motor control relay 331. The field loss relay 328 has the ends of its solenoid coil 332, respectively, connected with the wires 270 and 271 from the electronic controller 262 and which circuit includes, in series, in the wire 270 the D.-C. motor shunt field 333. Connected across the shunt field 333 is a thyrite resistor 334 which is well known in the art. The purpose of the thyrite resistor 334 is to limit the magnitude of inductive voltage which would develop in the shunt field circuit of the D.-C. motor and to hold the same to a value which would not damage the insulation of this motor shunt field if the current through the motor field were interrupted suddenly.

The energization of the solenoid coil 318 of the D.-C. motor forward switch 319 closes the normally open now closed contacts 335 which have one side thereof connected by a wire 336 to the rectified direct current wire 273 from the electronic controller 262 and said wire 336 has therein in series therewith, a D.-C. motor overload element 337. Extending from the other side of the contacts 335 of the D.-C. motor forward switch 319 is a wire 338, that extends to one side of normally open contacts 339 of a solenoid coil controlled multi-contact switch 340 that is quite similar to the solenoid coil controlled switch 319 and which switch 340 effects and controls the reverse rotation of the D.-C. motor. Connected with the wire 338 is one end of a wire 341 that has its other end connected to one side of the D.-C. motor armature 342. Extending from the other side of the armature 342 is a wire 343 terminating at one end of the D.-C. motor commutating field 344 and which commutating field has connected therewith one end of a wire 345 that has its other end connected to a wire 346 that extends between one side of a second set of normally open now closed contacts 347 of the D.-C. motor forward switch 319 and one side of a second set of normally open contacts 348 of the D.-C. motor reversing switch 340. The other side of the contacts 347 have connected therewith a wire 349 that terminates at one end of the D.-C. motor series field 350. The other side of the D.-C. motor series field 350 has connected therewith the wire 272 of the rectified direct current from the controller 262. To recapitulate, the circuit of the rectified direct current through the D.-C. motor armature, commutating field and series field is through wire 273, overload 337, wire 336, contacts 335, wires 338 and 341, armature 342, wire 343, commutating field 344, wires 345 and 346, contacts 347, wire 349, series field 350 and wire 272.

From the foregoing it will now be appreciated that the A.-C. motor and the D.-C. motor are each rotating. The D.-C. motor assists the A.-C. motor in rapidly bringing the load up to speed and the D.-C. motor continues to do so until its maximum speed is reached as determined by the setting of the potentiometer 263. When the A.-C. motor reaches a speed in excess of the speed of the D.-C. motor the electronic controller 262 comes into operation to prevent damage to the D.-C. motor through mechanism contained therein, and including the control relay C. E. M. F. 289. The relay 289, however operates only when the voltage across the armature 342 rises to a dangerous point and which condition may prevail if certain components of the electronic controller 362 break down during the A.-C. motor overhauling the D.-C. motor. Normally, when all of the elements are functioning properly, the relay 289 does not operate. It should be here noted that current normally flowing through the relay 289 is insufficient to operate same and open the normally closed contacts 288 thereof. The relay 289 has the opposite ends of its solenoid coil 351, respectively, connected by a wire 352 with the wire 338 and a wire 353 with the wire 346 wherefor the same voltage is impressed across the coil 351 as is impressed across the armature 342.

As was noted above the A.-C. motor winding 303 and D.-C. motor armature 342 have connected thereto, for rotation therewith, a plugging switch and the said rotation of the motors causes the movable element 354 thereof, connected by a wire 355 with the main wire or lead 257 the magnetic control circuit, to engage it fixed forward contact 356 has connected therewith one end of a wire 357 which has its other end connected with one side of normally open now closed contacts 358 of the A.-C. motor forward switch TF. The other side of the contacts 358 has connected therewith one end of a wire 359 that in turn is connected with one end of a solenoid coil 360 of plugging switch forward relay 361. The solenoid coil 360 has its other end connected with the other main lead or wire 258 of the magnetic control circuit by way of a wire 362 to the supplemental main lead or wire 283 and the circuit safety devices including overload 286 and C. E. M. F. relay 289. The energization of the plugging switch forward relay 361 closes normally open contacts 363 and 364 thereof which have one of their sides electrically connected by a wire 365 and which sides of said contacts are further connected by a wire 366 with the wire 359 to one end of the solenoid coil 360. The contacts 363 have their other side connected by a wire 367 with the wire 357 and therefore through the plugging switch contact 356, plugging switch movable element 354 and wire 355 with the main lead or wire 257 of the magnetic control circuit. The other side of the contacts 364 has connected therewith one end of a wire 368 which has its other end connected to a wire 369 leading to the normally closed now open contacts 370 of the A.-C. motor forward switch TF. The other side of the contacts 370 is connected by a wire 371 with one end of solenoid coil 372 of the A.-C. motor reversing switch TR and which solenoid coil 372 has its other end connected by a wire 373 to the wire 282 and sub main lead or wire 283 of the magnetic control circuit and through the circuit safety devices including overload 286 and C. E. M. F. relay 289 and wire 290 to the main wire or lead 258 of the magnetic control circuit. It will be noted that the circuit just described and including the solenoid coil 372 is broken or interrupted by the normally closed now open contacts 370 but the circuit is held in readiness to operate as soon as the A.-C. motor forward traverse switch or button 274 is released, since there has been provided a holding circuit around the plugging switch forward relay 361 that includes the circuit from the magnetic control circuit main lead or wire 257 through wire 355, plugging switch movable element 354, plugging switch contact 356, wires 366 and 367, plugging switch forward relay normally open now closed contacts 364, wires 365, 366 and 359, plugging switch forward relay solenoid coil 360, wire 362 and the sub main lead or wire 258 of the magnetic control circuit and through the circuit safety devices including overload 286 and C. E. M. F. relay 289 and wire 290 to the main wire or lead 258 of the magnetic control circuit.

Assuming now that the work and tool have been traversed a sufficient distance to bring them into operative relation the said forward traverse switch button 274 is released thereby breaking the circuit through its contacts 275 and effecting the deenergization of the A.-C. motor forward switch solenoid coil 281 thereby allowing contacts 291, 292, 293, 304 and 358 to drop open and effecting the closing the normally closed contacts 370. The closing of the contacts 370 effects the energization of the A.-C. motor reverse switch solenoid coil 372 through the following circuit, from main lead or wire 257 of the magnetic control circuit through wire 355, plugging switch movable member 354, plugging switch contact 356, wires 357 and 367, plugging switch forward relay contacts 363, wire 365, plugging switch forward relay contacts 364, wires 365, and 369, normally open now closed contacts 370, wire 371, solenoid coil 372, and wires 373 and 282 to the sub main wire or lead 283 of the magnetic control circuit and through the circuit safety devices including overload 286 and C. E. M. F. relay 289 and wire 290 to the main wire or lead 258 of the magnetic control circuit.

The energization of the A.-C. motor reverse switch solenoid coil 372 effects the closing of the normally open contacts 374, 375 and 376 of the A.-C. motor reverse switch TF and thereby through wires 377, 378 and 379, respectively, from one side of said contacts, reversely connects the main wires or lines L1, L2 and L3 with A.-C. motor winding terminals 300, 301 and 302 through wires 380, 381 and 382, respectively, from the other side of the contacts 374, 375 and 376 and thereby effecting a reverse effort thereof and which effort is, of course, resisted since the motor is still rotating in the forward direction due to stored energy in the rotation system. This squirrel cage A.-C. motor under the action of the reversing power being applied thereto decelerates quickly. The deceleration of the A.-C. motor is materially assisted by the D.-C. motor which, as pointed out above, is rotating at the same time as the A.-C. motor but under weakened field conditions and the said D.-C. motor has applied thereto dynamic braking for effecting the said deceleration of the A.-C. motor as follows:

The D.-C motor forward relay switch 319 had its normally open contacts 383 closed which have one side thereof connected by a wire 384 with the wire 314, which, as noted above, is connected through the normally closed contacts 312 of plugging switch reverse relay 313 with the wire 311 connected with one side of normally open at that time closed contacts 304 of A.-C. motor forward switch TF and which contacts 304 has its other side connected through a wire 305 with the supplemental lead wire 306 of the magnetic control circuit which has current flowing therethrough. The other side of the contacts 383 is connected by a wire 385 which extends through wires 386 and 387 to one end of solenoid coil 388 of control relay 331. The solenoid coil 388 has its other end connected by wires 389, and 390 with a wire 391 extending from the wire 320 to one side of another set of normally open at that time closed contacts 293 of D.-C. motor forward switch 319. The other side of the contacts 392 have connected therewith one end of a wire 393 that terminates in the wire 320. This circuit was completed through the control relay 322, overload 325, field loss relay 328, overload 286, and C. E. M. F. relay 289 to the main lead or wire 258 of the magnetic control circuit.

The control relay 331 through the energization of its solenoid coil 388 opened the normally closed contacts 394 thereof which have one side connected by a wire 395 with the magnetic control circuit main lead or wire 257 and which contacts 394 has its other side connected by a wire 296 with one end of a solenoid coil 397 of resistance control relay 398. The resistance control relay solenoid coil 397 has its other end connected by a wire 399 to a wire 400 that has one side of normally open contacts 401 of D.-C. motor reverse switch or relay 340. The circuit through the resistance control relay solenoid coil 397 beyond the wire 323 is through overload 325, field loss relay 328, overload 286, and C. E. M. F. relay 289 to the main lead or wire 258 of the magnetic control circuit.

From the foregoing it will be noted that the deenergization of the solenoid coil 318 of the D.-C. motor forward control switch 319 through the opening of the A.-C. motor forward switch TF upon the opening of the traverse forward switch 274 opened the contacts 383 of the said D.-C. motor forward control switch 319 thereby deenergizing solenoid coil 388 of control relay 331 and permitted the closing of the normally closed contacts 394 of said control relay 331 and thereby energized the solenoid coil 397 of resistance control relay 398. The energization of solenoid coil 397 closed contacts 402 and 403 of the said resistance control relay 398. The normally open now closed contacts 402 have connected therewith one end of a wire 404 which terminates at its other end in wire 338 which, as noted above, extends between normally open now open contacts 335 of the D.-C. motor forward switch 319 and the normally open now open contacts 339 of the D.-C. motor reverse switch 340. The other side of normally open now closed contacts 402 of the resistance control relay 398 has connected therewith one end of a wire 405 which terminates in a resistance 406 associated with the D.-C. motor armature 342 and commutating field 344. Extending from the other end of the resistance 406 is a wire 407 that terminates at one side of the second set of normally open now closed contacts 403 of the resistance control relay 398. The said contacts 403 has its other side connected by a wire 408 with the wire 346 which, as noted above, extends between the normally open now open contacts 347 of D.-C. motor forward switch 319 and normally open now open contacts 348 of D.-C. motor reverse switch 340. The closing of resistance control relay contacts 402 and 403 completes a circuit through the electronic controller 262 by way of a wire 409 from said electronic controller 262 that terminates at one side of normally closed now closed contacts 410 of D.-C. motor forward switch 319 and which contacts 410 has its other side connected by a wire 411 with the wire 336 and through wire 408, normally open now closed contacts 402, wire 405, resistance 406, wire 407, normally open now closed contacts 403, wires 408 and 346, wire 412 which has its one end connected with the wire 346 and its other end connected with one side of normally closed now closed contacts 413 of D.-C. motor reverse switch 348, said contacts 413 and a wire 414 which has one of its ends connected to the other side of said contacts 413 and its other end in the electronic controller 262.

At the same time there is current flow through a resistance "res. A" 415 which has one side thereof connected to one end of a wire 416 that terminates in the wire 414 and electronic controller 262. The other side of the resistance 415 is connected by a wire 417 with a second resistance "res. B" 418 and which resistance 418 has its other side connected by a wire 419 with the wire 409 and the electronic controller 262. The wire 417 between resistances 415 and 418 has connected therewith one end of a wire 419' that terminates in the wire 349 from the D.-C. motor forward switch normally open now open contacts 347 and D.-C. motor series field 350.

It will be appreciated from the foregoing that the resistance 406 is connected across the D.-C. motor armature 342 and commutating field 344 so that the same voltage flow is passing therethrough. Also, it will be noted that the resistances 415 and 418 are connected across the said D.-C. motor armature 342 and commutating field 344 and that the circuit including the resistance 406, the circuit including the D.-C. motor armature 342 and commutating field 344, and the circuit including the resistances 415 and 418 are in parallel and that dynamic braking is effected by the resistance 406 as is well known. The resistances 415 and 418 feed back or supply signals to the electronic controller 262 to limit the amount of dynamic braking current to a value which can be safely commutated, all of which is possible through the circuits above specifically described.

As the A.-C. motor rotating system and D.-C. motor armature 92 slow down the movable element 354 of the plugging switch is losing its holding power with the plugging switch forward contact 356, as is well known and as above pointed out. At the proper time, as determined by the setting of the plugging switch, the circuit including the contact 356 is broken thereby interrupting flow in the circuit from the magnetic circuit main wire 257 through wire 355, plugging switch movable element 354, forward contact 356, wires 357 and 367, contacts 363, wires 365, 366 and 359, solenoid coil 360 of plugging switch forward relay 361, wires 362, 283 and 284, overload 286, C. E. M. F. relay 289 and wire 290 to the return main lead or wire 258 of the magnetic control circuit. This deenergization of the A.-C. motor reverse switch solenoid coil 372 permits the said A.-C. motor reverse switch TF to drop open and disconnect the main current lines L1, L2 and L3 from the A.-C. motor windings 303 and the motor is then stopped.

When the A.-C. motor has been stopped, or just before it reaches a stop, it being understood that the opening of the traverse forward switch 274 almost immediately stops the movement of the table, the coasting, as is well known, not exceeding one or two inches from the maximum travel of two hundred and forty inches or more per minute, and assuming that it is desired to move the work and tool relative to one another at a slow or feeding rate, the forward feed switch or push button 317 is actuated for closing its contacts 316. This closes the circuit across said forward feed switch or button 317 between the feed stop switch or button 309 and the D.-C. motor forward control switch 319 for completing the same circuit that was completed by the traverse forward button 274 through the said D.-C. motor forward control switch 319. This circuit now includes the main lead 257 of the magnetic control circuit through the stop switch 277, wire 307, feed stop switch contacts 308, wire 310, forward feed switch contacts 316, wire 315, solenoid coil 318 of the D.-C. motor forward control switch 319, wire 320, contacts 321 of control relay 322, wire 323, contacts 324 of overload 325, wire 326, contacts 327 of field loss relay 328, wire 284, contacts 285 of overload 286, wire 287, contacts 288 of C. E. M. F. relay 289, and wire 290 back to the main lead or wire 258 of the magnetic control circuit.

The closing of the normally open contacts 335, 347, 383 and 392 of the D.-C. motor forward switch 319 effects the completion of the same circuits above described for supplying the desired adjusted rectified direct current to the D.-C. motor armature 342, the D.-C. motor commutating field 344 and the D.-C. motor series field 350 at voltages determined by the setting of the potentiometer 263 which determines the rate of rotation of the said D.-C. motor. At the same time the D.-C. motor forward switch contacts 383 completes a circuit for holding the said D.-C. motor forward switch 319 closed even though the feed forward switch 317 is opened. This circuit includes a wire 420 having one of its ends connected to wire 385 from one side of the said contacts 383 with said wire 420 having its other end connected to one side of contacts 421 of normally closed traverse forward switch or push button 274'. The other side of the contacts 421 has connected therewith one end of a wire 422 that has its other end connected to one side of contacts 423 of normally closed traverse reverse switch or push button 424' mechanically connected to normally open traverse reverse switch or push button 424 to be later described and referred to. The other side of the contacts 423 has connected therewith one end of a wire 425 that terminates in one end of a solenoid coil 426 of holding contact control relay 427. The other end of the solenoid coil 426 has connected therewith one end of the wire 390 that extends to wire 391. The circuit through the holding or control relay 427 is from main lead or wire 257 through the stop switch 277, wire 307, contacts 308 of normally closed stop switch 309, wire 310, contacts 316 of normally open now closed feed forward switch 317, wires 314 and 384, normally open now closed contacts 383 of D.-C. motor forward switch 319, wires 385 and 420, contacts 421 of normally closed traverse forward switch 274', wires 422, contacts 423 of traverse reverse switch 424', wire 425, solenoid coil 426 of holding contact relay 427, wires 390 and 391, normally open now closed contacts 392 of D.-C. motor forward switch 319, wires 393 and 323, overload 325, control relay 328, overload 286, C. E. M. F. relay 289, wire 290 to the main lead or wire 258 of the magnetic control circuit. It will be noted that this circuit by-passed the control relay 322 so that it remains complete upon the opening of normally open contacts 321 of said control relay 322. The operation of the holding circuit relay 427 closes the normally open contacts 428 thereof.

The contacts 428 of the holding circuit relay 427 has connected to one side thereof one end of a wire 429 which has its other end connected to the magnetic control circuit sub lead or wire 306 and therefore the main lead or wire 257 of said magnetic control circuit. The other side of the contacts 428 has connected therewith the end of the wire 386 which, through the wire 385, connects with the normally open now closed contacts 383 of D.-C. motor forward switch 319. This set of contacts 428 provides a holding circuit for the D.-C. motor forward switch 319, the circuit being from the magnetic control circuit main lead or wire 257 through stop switch 277, wire 307, feed stop switch or button 309, sub lead or wire 306, wire 429, contacts 428 of holding circuit relay 427, wires 386 and 388, contacts 383, wires 384 and 314, solenoid coil 318 of D.-C. motor forward switch 319, wires 320 and 391 to normally open now closed contacts 392 and then through the wires and other electrical instrumentalities above described for completing the holding relay circuit beyond the said contacts 392 of the D.-C. motor forward switch 319. The normally open feed forward button 317 may now be released without disrupting the circuit to the D.-C. motor and therefore without stopping the said motor.

The relatively slow or feed movement between the table and tool continues until the circuit is interrupted which may be effected by actuation of either the general stop button 277 or the feed stop button 309 or by the actuation of either the forward traverse button 274′, or the reverse traverse button 424′ which will interrupt the circuit including the holding circuit relay contacts 428 and thereby deenergize the solenoid coil of the D.-C. motor forward switch 319 which will permit the closing of the control relay 331 for supplying current through the resistance control relay 396 for cutting in the resistances 406, 415 and 418 for dynamic braking of the said D.-C. motor to a stop.

In the event that the traverse forward button 274 or 274′ is actuated the other will likewise be actuated since they are mechanically connected and thereby set up the circuits previously described for effecting the rotation of the A.-C. motor and thereby a rapid traversing of the table and work thereon relative to the tool. This condition may exist where the work is provided with spaced portions that are to be tooled and which space between the said portions is to be rapidly traversed. It may be that it is desired to return the table and work to their initial position, namely, to the point where the traverse forward movement started in which event the traverse reverse switch or button 424 or 424′ may be actuated for completing the following electrical circuits and reversely rotating the A.-C. and D.-C. motors.

The traverse reverse switch 424 has one side of its normally open contacts 430 connected by a wire 431 with the main lead or wire 257 of the magnetic control circuit and the said contacts has its other side connected to the end of the wire 369 which, as above noted, terminates in the normally closed now closed contacts 370 of the A.-C. motor forward switch TF. The closing of said traverse reverse switch or button 424 completes the circuit from the magnetic control circuit main lead or wire 257 through wire 431, now closed contacts 430, wire 369, contacts 370, solenoid coil 372 of A.-C. motor reverse switch TF wires 373, 282, 283, and 284, overload 286, C. E. M. F. relay 289 and wire 290 to the other main lead or wire 258 of the magnetic control circuit, thus energizing the solenoid coil 372 of the A.-C. motor reverse switch TF.

The energization of the solenoid coil 372 of A.-C. motor reverse switch TR closes its normally open contacts 374, 375 and 376 for connecting the main lines L1, L2 and L3 respectively, through the wires 377 and 280, 378 and 381 and 379 and 382 with the A.-C. motor winding terminals 302, 301 and 300 for effecting the reverse rotation of the A.-C. motor armature as pointed out above. The reverse rotation of the A.-C. motor armature 303 reversely actuates the plugging switch for causing the movable element 354 thereof to engage the plugging switch reverse contact 432. The said plugging switch reverse contacts 432 has connected therewith one end of a wire 433 which terminates at its other end at one side of normally open now closed contacts 434 of the A.-C. motor reversing switch TF. The other side of the contacts 434 has connected therewith one end of a wire 435 that terminates at its other end at one end of a solenoid coil 436 of plugging switch reverse relay 313 and which solenoid coil 436 has connected with its other end a wire 437 that terminates in the sub lead or wire 283 of the magnetic control circuit. As pointed out above the sub lead or wire 283 of the magnetic control circuit completes the circuit through wire 284, overload 286, wire 287, C. E. M. F. relay 289 and wire 290 to the main wire or lead 258 of the magnetic control circuit.

The energization of the plugging switch reverse relay solenoid coil 436 closes normally open contacts 438 and 439 thereof which have one of their sides electrically connected by a wire 440 and which wire 440 is in turn connected to the wire 435 by a wire 441 for establishing a holding circuit as will later be made clear. The other side of the contacts 438 has connected therewith one end of a wire 442 that terminates in the wire 433 and is thereby connected with the now closed plugging switch reverse relay contacts 432. The other side of the contacts 439 has connected therewith one end of a wire 443 that terminates in the wire 278 from the traverse forward switch 274 and which wire 278 terminates at the normally closed now open contacts 279 of the A.-C. motor reverse switch TR. With the closing of the plugging switch reverse relay contacts 438 and 439 a holding circuit for said relay was set up including a circuit through the magnetic control circuit main lead or wire 257, wire 355, plugging switch movable element 354, plugging switch reverse contact 432, wires 433 and 442, contacts 438, wires 440, 441 and 435, solenoid coil 436, wires 437, 283 and 284, overload 286, wire 287, CEMF relay 289, and wire 290 back to the main lead or wire 258 of the magnetic control circuit.

The closing of the A.-C. motor reverse switch TR closed normally open contacts 444 which has connected to one side thereof one end of a wire 445 that terminates in the sub lead or wire 306 of the magnetic control circuit. The other side of the contacts 444 has connected therewith one end of a wire 446 that terminates at one side of normally closed now closed contacts 447 of plugging switch forward relay 361. The other side of the contacts 447 has connected therewith one end of a wire 448 that terminates in one end of a solenoid coil 449 of D.-C. motor reversing switch 340. The other end of the solenoid coil 449 has connected therewith one end of a wire 450 that terminates in the wire 350 extending to the wire 320 for completing a circuit through control relay 322, overload 325, field loss relay 328, overload 286, C. E. M. F. relay 289 and wire 290 to the other side of the magnetic control circuit main lead or wire 258.

The closing of the D.-C. motor reverse switch 340 closes normally open contacts 348 and 339. One side of the contacts 348 has connected therewith one end of a wire 451 which terminates at its other end in the wire 336 in the side of the overload element 337 therein remote from the electronic controller 362 and which overload element 337 has the wire 273 between itself and the said electronic controller 362. The other side of the contacts 348, as pointed out above, has connected therewith one end of the wire 346 that has connected therewith the wire 345 which terminates at the remote end of the commutating field 344. The contacts 339 of the D.-C. motor reverse switch 340 has one side thereof connected to one end of a wire 452 that terminates in the wire 349 at one end of the D.-C. motor series field 350 while the other side of the said contacts 339 has connected therewith, as noted above, one end of a wire 338 that has connected to it one end of the wire 341 leading to, as far as the D.-C. motor reverse switch is concerned, the remote side of the D.-C. motor armature 342. The reverse current flow through the D.-C. motor is as follows: From the electronic controller 262 through wire 273, overload element 337, wire 451, D.-C. motor reverse switch contacts 348, wires 346 and 345, commutating field 344, wire 343, D.-C. motor armature 342, wires 341 and 338, D.-C. motor reversing switch contacts 339, wires 452 and 349, D.-C. motor series field 350 and wire 272 back to the electronic controller 262. From this it will be seen that the current flow through the D.-C. motor is reversed from that as effected through the D.-C. motor forward switch 319 wherefore the D.-C. motor is rotated in a reverse direction. It will be understood that the D.-C. motor assists in bringing the load up to speed in the reverse direction as was above described in connection with the forward rotation of these motors. At the same time the D.-C. motor after reaching its maximum speed rotates under the driving force of the A.-C. motor but with a weakened field due to the control mechanism as above described and pointed out.

After the table and work thereon have been traversed in a reverse direction sufficiently the traverse reverse switch or push button 424 is released whereupon the motor reversing switch TF drops out to break the various contacts thereof and closes the normally closed contacts 279 for completing the circuit through the motor forward switch solenoid coil 281 and thereby cutting in the current for effecting a forward effort in the A.-C. motor.

The closing of the D.-C. motor reversing switch 340 closed normally open contacts 453 thereof which has connected to one side thereof one end of a wire 454 which has its other end connected to the wire 448 and therefor the normally closed contacts 447 of plugging switch forward relay 361. The other side of the D.-C. motor reverse switch contacts 453 has connected thereto one end of a wire 455 that terminates at its other end in the wire 386 from which extends the wire 387 for the control relay 331 which in turn operates the resistance control relay 398 as above described. The circuit to the control relay 331 through the D.-C. motor reverse switch 340 is as follows: From the main lead or wire 257 through the stop switch 277, wire 307, normally closed feed stop switch 309, wires 310, 306 and 445, normally open at this time closed contacts 444 of A.-C. motor reversing switch TR, wire 446, normally closed now closed contacts 447 of plugging switch relay 361, wires 448 and 454, normally open now closed contacts 453 of D.-C. motor reverse switch 340, wires 455, 386 and 387, solenoid coil 388 of control relay 31, wires 389, and 450, normally open now closed contacts 401 of D.-C. motor reverse switch 340, wires 400, 393, and 323, overload 325, field loss relay 328, overload 286, C. E. M. F. relay 289 and wires 290 back to the main lead or wire 258 of the magnetic control circuit. From this it follows that the opening of the A.-C. motor reverse switch TR and de-energizing the D.-C. motor reverse switch 340 breaks the said contacts 453 thereof for deenergizing the control relay 331 so that its normally closed contacts are then closed whereupon the resistance control relay 398 is energized for cutting in the resistances 406, 415 and 418 and applying dynamic braking to the D.-C. motor armature 342 and effecting its rapid deceleration and the stopping thereof.

In the event it were desired to reverse feed the work and tool at the end of the forward feeding movement, above described, instead of reversely traversing the parts, the reverse feed button 456 would be actuated for closing the contacts 457 thereof. A reverse feed may be desirable after a lateral translation or feeding movement of the work and tool and which lateral movement would be effected by the head and rail control mechanism which is substantially identical with that above described and illustrated in Fig. 25. Regardless of the reason for a feed or relatively slow movement between the work and tool opposite to that above described the feed reverse button 456 is actuated to close the contacts 457 thereof.

Contacts 457 has one side thereof connected by a wire 458 with the sub lead or wire 306 of the magnetic control circuit, which has current available therein flowing from the main lead or wire 257 of the magnetic control circuit and therefore to said feed reverse switch or button 456. The other side of the contacts 457 has connected therewith one end of a wire 459 that terminates in the wire 448 leading to one end of the solenoid coil 449 of D.-C. motor reverse switch 340 and which circuit from the other end of the solenoid coil 449 is completed as above described for thereby closing the contacts 339, 348 and 401 for effecting the reverse rotation of the D.-C. motor at the speed determined by the adjustment of the potentiometer 263 as above described.

The closing of the D.-C. motor reverse switch 340 also closes contacts 401 which has one side thereof connected by a wire 460′ with the wire 448 leading to one end of D.-C. motor reverse switch solenoid coil 449. The other side of the contacts 401 have connected therewith, as above pointed out, a wire 400 that terminates at its other end in wire 393 that in turn terminates in the wire 320. By this construction there is supplied a holding circuit for the D.-C. motor reversing switch 340 so that the feed reversing switch or button 456 may be released without interrupting the said reverse feed of the work and tool. The current flow through the holding circuit for the D.-C. motor reverse switch 340 is from line 257 of the magnetic control circuit through stop button 277, wire 307, feed stop switch or button 309, wires 310, 306 and 429, contacts 428 of holding relay 427, wires 386 and 455, contacts 401 of D.-C. motor reversing switch 340, wires 459 and 448, D.-C. motor reverse switch solenoid coil 449, wires 450, 390 and 391 and 320, overload 325, field loss relay 328, overload 286, C. E. M. F. relay 289 and wire 290 to the main wire or lead 258 of the magnetic control circuit.

The reverse slow or feeding movement of the table will continue until the feed stop switch or button 309 is actuated or the traverse forward switch or button 274' or the traverse reverse switch or button 424' is actuated which will deenergize the solenoid coil 449 for the D.-C. reverse switch 340 and thereby cut off the current to the D.-C. motor armature and fields. It being understood that the same result is obtained by opening the stop switch 277. The opening of either of the switches just mentioned cuts in the dynamic braking resistance 406 for bringing the said D.-C. motor to a stop and at the same time brings into the circuit the control resistances 415 and 418.

At this time the table may be actuated at traverse rates in either direction or at a feeding rate in a forward direction by merely pressing the proper switch button.

As was noted above the wiring diagram in Fig. 25 is substantially identical with that of Fig. 24 and shows the wiring for the heads and rail motors 112 and 113. As will be noted the main voltage lines L1, L2 and L3 are common to both the wiring diagrams of Figs. 24 and 25 and that the main leads or wires 257 and 258 of the magnetic control circuit are likewise common in both diagrams. In other words the magnetic control circuit for the heads and rail motors 112 and 113 receives its power from the voltage step down transformer 255 shown in Fig. 23.

The foregoing description for the wiring diagram of Fig. 24 may be utilized for Fig. 25 reading, however, the reference characters as having a "zero" added thereto except for the above mentioned common current leads or wires L1, L2, L3, 257 and 258. Another distinction between the wiring diagrams of Figs. 24 and 25 is that the forward switch "TF" of Fig. 24 is designated as "TUO" while the reverse switch "TR" in Fig. 24 is designated in Fig. 25 as "TDI." These designations, in view of the foregoing description, are self-explanatory since the A.-C. motor for the rail and heads when rotating in a forward motion effects an upward movement of the side heads and rail and an outward movement of the rail heads, while the said motors when rotating in a reverse direction effect a downward movement of the side heads and rail and an inward movement of the rails heads.

In describing the probable cycles of movement of the table at traverse and feed rates in forward and reverse directions it should be understood that these movements need not follow one another in sequential order but that between said movements the side heads, the rail with its heads or the rail heads may be given traverse or feed movements before subsequent table movement and that the several switches or buttons for the heads and rail motors such as 3170, 3740 and 2740', 4240 and 4240' and 4560 are located at the opertor's station, namely, the pendent station as specifically disclosed in this application whereby they may be readily and conveniently operated. The potentiometer 2630 for the heads and rail motors is likewise carried by the pendent station for instantaneous changing in the rate of rotation of the heads-rail D.-C. motor 113.

It will be understood that the table motors and the heads-rail motors may be simultaneously operated which, when the D.-C. feed motors are in operation, will result in the tooling of a path angularly disposed to the horizontal plane of movement of the work table and the vertical plane of movement of the side heads and rail which may result in the tooling in an arcuate path depending upon the relative speeds of the motors. It is of course obvious that since the potentiometers 263 and 2630 are each carried by the pendent station that they may be adjusted during the actual operation of the motors controlled thereby, whereby the angular or arcuate paths being machined can be continuously adjusted by the operator.

It should be here noted that the stop switch 277 in the main lead or wire 257 of the magnetic control circuit if actuated will deenergize the entire magnetic control circuit and may be referred to as the emergency stop for returning the said magnetic control circuit to its neutral condition and accomplishes the function accomplished by the feed stop switch or button 309 of the table feed circuit or the feed stop switch or button 3090 of the heads-rail feed motor, as well as the function of opening the normally closed traverse forward switch buttons 274' and 2740', respectively, in the table and heads-rail circuits, and the opening of the normally closed traverse reverse switches or buttons 424' and 4240', respectively, in the table motors control circuit and the heads-rail motors control circuit, and also performs the function performed by releasing the traverse forward switch buttons 274 and 2740, respectively, in the table motors control circuit and the heads-rail motor control circuit, or the release of the traverse reverse switch buttons 424 and 4240, respectively, in the table motors control circuit and the heads-rail motor control circuit. In actual practice this stop switch 277 is located to be within easy reach of the operator and is shown in Fig. 22 as a short rod 277 depending from the lower end of the pendent station housing 241. This emergency stop may be in the form to receive a blow from the operator's fist or may be arranged to be operated by his foot, instead of being merely actuated by the opertaor's hand as in the case in the specific mechanism illustrated.

From the foregoing it is believed now evident that there has been provided a machine tool which accomplishes the objects initially set forth and which may have substantially universal movement imparted to a plurality of slides or other translatable supports which are adapted to support work pieces and tools and which universal movement may be at adjustable rates from one inch to two hundred and forty inches per minute for thereby tooling work in all directions in a horizontal plane, a vertical plane or any angular plane or arcuate path between the horizontal and vertical and at speeds that are infinitely adjustable between the high and low limits of speed.

What is claimed is:

1. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed motor and an adjustable speed motor, said adjustable speed motor having a maximum speed less than the speed of the constant speed motor, means for connecting said motors simultaneously with the initial driving shaft for moving said one member at a constant speed as determined by the constant speed motor and the motion imparting system and at adjustable speeds as determined by the adjustment of the adjustable speed motor and the motion imparting system and means for starting and stopping said motors.

2. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed motor and an adjustable speed motor, said adjustable speed motor having a maximum speed less than the speed of the constant speed motor, means for connecting said motors simultaneously with the initial driving shaft for moving said one member at a constant speed as determined by the constant speed motor and the motion imparting system and at adjustable speeds as determined by the adjustment of the adjustable speed motor and the motion imparting system, and operating means for said motors for causing their simultaneous rotation to bring the load up to the determined constant speed and for cutting out the constant speed motor and causing the rotation of the adjustable speed motor only.

3. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed motor and an adjustable speed motor, said adjustable speed motor having a maximum speed less than the speed of the constant speed motor, means for connecting said motors simultaneously with the initial driving shaft for moving said one member at a constant speed as determined by the constant speed motor and the motion imparting system and at adjustable speeds as determined by the adjustment of the adjustable speed motor and the motion imparting system, operating means for said motors for causing their simultaneous rotation to bring the load up to the determined constant speed and for cutting out the constant speed motor and causing the rotation of the adjustable speed motor only, and means for effecting an adjustment of the speed of the adjustable speed motor.

4. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed motor and an adjustable speed motor, said adjustable speed motor having a maximum speed less than the speed of the constant speed motor, means for connecting said motors simultaneously with the initial driving shaft for moving said one member at a constant speed as determined by the constant speed motor and the motion imparting system and at adjustable speeds as determined by the adjustment of the adjustable speed motor and the motion imparting system, operating means for said motors for causing their simultaneous rotation to bring the load up to the determined constant speed, and means for protecting the adjustable speed motor against damage when being driven by the constant speed motor after the speed of the adjustable speed motor has been reached.

5. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed motor and an adjustable speed motor, said adjustable speed motor having a maximum speed less than the speed of the constant speed motor, means for connecting said motors simultaneously with the initial driving shaft for moving said one member at a constant speed as determined by the constant speed motor and the motion imparting system and at adjustable speeds as determined by the adjustment of the adjustable speed motor and the motion imparting system, operating means for said motors for causing their simultaneous rotation to bring the load up to the determined constant speed, and means for protecting the adjustable speed motor against damage when being driven by the constant speed motor after the speed of the adjustable speed motor has been reached, and additional means for applying dynamic braking to the motors for decelerating and stopping the translation of the translatable member whether said member is being translated by the constant speed motor and adjustable speed motor simultaneously or being translated by the adjustable speed motor only.

6. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed A.-C. motor and an adjustable speed D.-C. motor, said D.-C. motor having a maximum speed less than the speed of the constant speed motor, means for connecting said motors simultaneously with the initial driving shaft for moving said one member at a constant speed as determined by the adjustment of the A.-C. motor and motion imparting system and at adjustable speeds as determined by the adjustment of the D.-C. motor and the motion imparting system, and means for starting and stopping said motors.

7. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed A.-C. motor and an adjustable speed D.-C. motor, said D.-C. motor having a maximum speed less than the speed of the constant speed motor, means for connecting said motors simultaneously with the initial driving shaft for moving said one member at a constant speed as determined by the A.-C. motor and motion imparting system and at adjustable speeds as determined by the adjustment of the D.-C. motor and the motion imparting system, and operating means for said A.-C. and D.-C. motors for causing their simultaneous rotation to bring the load up to the speed of the A.-C. motor and for causing the rotation of the D.-C. motor with a weakened field when being driven by the A.-C. motor after its speed is passed.

8. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed A.-C. motor and an adjustable speed D.-C. motor, said D.-C. motor having a maximum speed less than the speed of the constant speed motor, means for connecting said motors simultaneously with the initial driving shaft for moving said one member at a constant speed as determined by the A.-C. motor and the motion imparting system and at adjustable speeds as determined by the adjustment of the D.-C. motor and the motion imparting system, and operating means for said A.-C. and D.-C. motors for causing their simultaneous rotation to bring the load up to the speed of the A.-C. motor and for causing the rotation of the D.-C. motor with a weakened field when being driven by the A.-C. motor after its speed is passed, and for cutting out the A.-C. motor and causing the rotation of the D.-C. motor only.

9. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed A.-C. motor and an adjustable speed D.-C. motor, said D.-C. motor having a maximum speed less than the speed of the constant speed motor, means for connecting said motors simultaneously with the initial driving shaft for moving said one member at a constant speed as determined by the A.-C. motor and the motion imparting system and at adjustable speeds as determined by the adjustment of the D.-C. motor and the motion imparting system, operating means for said A.-C. and D.-C. motors for causing their simultaneous rotation to bring the load up to the speed of the A.-C. motor and for causing the rotation of the D.-C. motor with a weakened field when being driven by the A.-C. motor after its speed is passed, and additional means for applying dynamic braking to the D.-C. motor for decelerating the speed of the motors.

10. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed A.-C. motor and an adjustable speed D.-C. motor, said D.-C. motor having a maximum speed less than the speed of the constant speed motor, means for connecting said motors simultaneously with the initial driving shaft for moving said one member at a constant speed as determined by the A.-C. motor and the motion imparting system and at adjustable speeds as determined by the adjustment of the D.-C. motor and the motion imparting system, operating means for said A.-C. and D.-C. motors for causing their simultaneous rotation to bring the load up to the speed of the A.-C. motor and for causing the rotation of the D.-C. motor with a weakened field when being driven by the A.-C. motor after its speed is passed, and for cutting out the A.-C. motor and causing the rotation of the D.-C. motor only, and additional means for applying dynamic braking to the D.-C. motor for decelerating and stopping the translation of the member whether being translated by the A.-C. and D.-C. motors simultaneously or being translated by the D.-C. motor only.

11. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed A.-C. motor and an adjustable speed D.-C. motor, said D.-C. motor having a maximum speed less than the speed of the constant speed motor, means for connecting said motors simultaneously with the initial driving shaft for moving said one member at a constant speed as determined by the A.-C. motor and the motion imparting system and at adjustable speeds as determined by the adjustment of the D.-C. motor and the motion imparting system, and means for effecting an adjustment of the speed of the D.-C. motor.

12. A machine tool comprising, in combination, a supporting structure, a work supporting member on said structure, a tool supporting member on said structure, one of said members being translatable relative to said structure, and a motion imparting system drivingly connected to said one member, said system being nonadjustable in speed and including an initial driving shaft, a power plant comprising a constant speed A.-C. motor and an adjustable D.-C. motor, said D.-C. motor having a maximum speed less than the speed of the constant speed motor, means for connecting said motors simultaneously with the initial driving shaft for moving said one member at a constant speed as determined by the A.-C. motor and the motion imparting system and at adjustable speeds as determined by the adjustment of the D.-C. motor and the motion imparting system, operating means for said A.-C. and D.-C. motors for causing their simultaneous rotation to bring the load up to speed of the A.-C. motor and for causing the rotation of the D.-C. motor with a weakened field when being driven by the A.-C. motor after its speed is passed, and for cutting out the A.-C. motor and causing the rotation of the D.-C. motor only, and means for effecting an adjustment of the speed of the adjustable speed motor.

13. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion importing systems including a common initial driving shaft, a power plant comprising a constant speed motor and an adjustable speed motor, said adjustable speed motor having a maximum speed less than the speed of the constant speed motors, means for connecting said motors simultaneously with the initial driving shaft, a clutch in each motion imparting system for connecting it with the initial driving shaft for moving the translatable members selectively or simultaneously at a constant speed, as determined by the constant speed motor and the motion imparting system and at adjustable speeds, as determined by the adjustment of the adjustable speed motor and the motion imparting system and means for starting and stopping the motors.

14. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed motor and an adjustable speed motor, said adjustable speed motor having a maximum speed less than the speed of the constant speed motor, means for connecting said motors simultaneously with the initial driving shaft, a clutch in each motion imparting system for connecting it with the initial driving shaft for moving the translatable members selectively or simultaneously at a constant speed, as determined by the constant speed motor and the motion imparting system, and at adjustable speeds, as determined by the adjustment of the adjustable speed motor and the motion imparting system, and operating means for said motors for causing their simultaneous rotation to bring the load up to constant speed and for cutting out the constant speed motor and causing the rotation of the adjustable speed motor only.

15. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed motor and an adjustable speed motor, said adjustable speed motor having a maximum speed less than the speed of the constant speed motor, means for connecting the said motors simultaneously with the initial driving shaft, a clutch in each motion imparting system for connecting it with the initial driving shaft for moving the translatable members selectively or simultaneously at a constant speed, as determined by the constant speed motor and the motion imparting system, and at adjustable speeds, as determined by the adjustment of the adjustable speed motor and the motion imparting system, operating means for said motors for causing their simultaneous rotation to bring the load up to constant speed and for cutting out the constant speed motor and causing the rotation of the adjustable speed motor only, and means for effecting an adjustment of the speed of the adjustable speed motor.

16. A machine tool, comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed motor and an adjustable speed motor, said adjustable speed motor having a maximum speed less than the speed of the constant speed motor, means for connecting said motors simultaneously with the initial driving shaft, a clutch in each motion imparting system for connecting it with the initial driving shaft for moving the translatable members selectively or simultaneously at a constant speed, as determined by the constant speed motor and the motion imparting system, and at adjustable speeds, as determined by the adjustment of the adjustable speed motor and the motion imparting system, operating means for said motors for causing their simultaneous rotation to bring the load up to the constant speed, and means for protecting the adjustable speed motor against damage when being driven by the constant speed motor after the speed of the adjustable speed motor has been reached.

17. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed motor and an adjustable speed motor, said adjustable speed motor having a maximum speed less than the speed of the constant speed motor, means for connecting said motors simultaneously with the initial driving shaft, a clutch in each motion imparting system for connecting it with the initial driving shaft, for moving the translatable members selectively or simultaneously at a constant speed, as determined by the constant speed motor and the motion imparting system, and at adjustable speeds, as determined by the adjustment of the adjustable speed motor and the motion imparting system, operating means for said motors for causing their simultaneous rotation to bring the load up to the constant speed, means for protecting the adjustable speed motor against damage when being driven by the constant speed motor after the speed of the adjustable speed motor has been reached, and additional means for applying dynamic braking to the motors for decelerating the speed thereof.

18. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed A.-C. motor and an adjustable speed D.-C. motor, said D.-C. motor having a maximum speed less than the speed of the constant speed motor, means for connecting said motors simultaneously with the initial driving shaft, a clutch in each motion imparting system for connecting it with the initial driving shaft for moving the translatable members selectively or simultaneously at a constant speed as determined by the constant speed motor and the motion imparting system and at adjustable speeds as determined by the adjustment of the D. C. motor and the motion imparting system, and means for starting and stopping the rotation of said motors.

19. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed A.-C. motor and an adjustable speed D.-C. motor, said D.-C. motor having a maximum speed less than the speed of the constant speed motor, and operating means for said A.-C. and D.-C. motors for causing their simultaneous rotation to bring the load up to the determined constant speed, and for causing the rotation of the D.-C. motor with a weakened field when being driven by the A.-C. motor after its speed has been passed.

20. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed A.-C. motor and an adjustable speed D.-C. motor, said D.-C. motor having a maximum speed less than the speed of the constant speed motor, and operating means for said A.-C. and D.-C. motors for causing their simultaneous rotation to bring the load up to the determined constant speed, and for causing the rotation of the D.-C. motor with a weakened field when being driven by the A.-C. motor after its speed has been passed, and for cutting out the A.-C. motor and causing the rotation of the D.-C. motor only.

21. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting systems including a common initial driving shaft, a power plant comprising a constant speed A.-C. motor and an adjustable D.-C. motor, said D.-C. motor having a maximum speed less than the speed of the constant speed motor, operating means for said A.-C. and D.-C. motors for causing their simultaneous rotation to bring the load up to the determined constant speed, and for causing the rotation of D.-C. motor after its speed has been passed, and additional means for applying dynamic braking to the D.-C. motor for decelerating the speed of the motors.

22. A machine tool comprising, in combination, a supporting structure, work supporting means on said structure, tool supporting means on said structure, a first translatable member slidably mounted on said structure, a second translatable member slidably mounted on the first member and movably supporting one of said means, a separate motion imparting system operatively connected to each of the translatable members, each motion imparting system being nonadjustable in speed and said motion imparting system including a common initial driving shaft, a power plant comprising a constant speed A.-C. motor and an adjustable speed D.-C. motor, said D.-C. motor having a maximum speed less than the speed of the constant speed motor, operating means for said A.-C. and D. C. motors for causing their simultaneous rotation to bring the load up to the determined constant speed, and for causing the rotation of the D.-C. motor after its speed has been passed, and for cutting out the A.-C. motor and causing the rotation of the D.-C. motor only, and additional means for applying dynamic braking to the D.-C. motor for decelerating and stopping the translation of the member or members whether being translated by the A.-C. and D.-C. motors simultaneously or being translated by the D.-C. motor only.

23. A machine tool comprising, in combination, a translatable work supporting table movable through a horizontal plane, a tool supporting slide, means for mounting the tool supporting slide for movement through a vertical path relative to the plane of movement of the table and through a path parallel with the plane of movement of the table but transversely thereof, a motion transmitting system for the table, a motion transmitting system for effecting the vertical movement of the tool slide, a separate motion transmitting system for effecting the horizontal movement of the tool slide, said tool slide motion transmitting systems including a common initial driving shaft, each of said motion transmitting systems being nonadjustable as to speed, power means for the work table motion transmitting system connected therewith, a separate power means for the tool slide motion transmitting systems connected with the common initial driving shaft, said power means being each adjustable as to speed whereby the work table may be actuated at traverse and feeding rates and whereby the tool slide may be actuated through its vertical and horizontal paths simultaneously and sequentially at traverse and feeding rates, and separate control means for each power means whereby they may be simultaneously and individually actuated for thereby simultaneously and individually actuating the work table and tool slides through their paths of movement at traverse and feeding rates.

24. A machine tool comprising, in combination, a translatable work supporting table movable through a horizontal plane, a tool supporting slide, means for mounting the tool supporting slide for movement through a vertical path relative to the plane of movement of the table and through a path parallel with the plane of movement of the table but transversely thereof, a motion transmitting system for the table, a motion transmitting system for effecting the vertical movement of the tool slide, a separate motion transmitting system for effecting the horizontal movement of the tool slide, said tool slide motion transmitting systems comprising a common initial driving shaft, each of said motion transmitting systems being nonadjustable as to speed, power means for the work table motion transmitting system connected therewith, a separate power means for the tool slide motion transmitting systems connected with the common initial driving shaft, said power means being each adjustable as to speed whereby the work table may be actuated at traverse and feeding rates and whereby the tool slide may be actuated through its vertical and horizontal paths simultaneously and sequentially at traverse and feeding rates, and separate control means for each power means whereby they may be simultaneously and individually actuated for thereby simultaneously and individually actuating the work table and tool slide through their paths of movement at traverse and feeding rates, including separate pilot means for effecting the simultaneous actuation of the power means at traverse rates, feeding rates, and selectively at traverse and feeding rates for thereby correspondingly translating the work table and tool slide and whereby a tooling operation may be performed through a path other than the paths as individually defined by the translation of the work table and tool slide.

25. A machine tool comprising, in combination, a translatable work supporting table movable through a horizontal plane, a tool supporting slide, means for mounting the tool supporting slide for movement through a vertical path relative to the plane of movement of the table and through a path parallel with the plane of movement of the table but transversely thereof, a motion transmitting system for the table, a motion transmitting system for effecting the vertical movement of the tool slide, a separate motion transmitting system for effecting the horizontal movement of the tool slide, said tool slide motion transmitting systems comprising a common initial driving shaft, each of said motion transmitting systems being nonadjustable as to speed, power means for the work table motion transmitting system connected therewith, a separate power means for the tool slide motion transmitting systems connected with the common initial driving shaft, said power means being each adjustable as to speed whereby the work table may be actuated at traverse and feeding rates and whereby the tool slide may be actuated through its vertical and horizontal paths simultaneously and sequentially at traverse and feeding rates, and separate control means for each power means whereby they may be simultaneously and individually actuated for thereby simultaneously and individually actuating the work table and tool slide through their paths at traverse and feeding rates, including separate pilot means for effecting the simultaneous actuation of the power means at traverse rates, feeding rates, and selectively at traverse and feeding rates for thereby correspondingly translating the work table and tool slide and whereby a tooling operation may be performed through a path other than the paths as individually defined by the translation of the work table and tool slide, and said control means further including separate pilot means for individually adjusting the feed rate of the power means whereby the tooling path may be varied.

26. A machine tool comprising, in combination, a translatable work supporting table movable through a horizontal plane, a tool supporting slide, means for mounting the tool supporting slide for movement through a vertical path relative to the plane of movement of the table and through a path parallel with the plane of movement of the table but transversely thereof, a motion transmitting system for the table, a motion transmitting system for effecting the vertical movement of the tool slide, a separate motion transmitting system for effecting the horizontal movement of the tool slide, said tool slide motion transmitting systems comprising a common initial driving shaft, each of said motion transmitting systems being nonadjustable as to speed, power means for the work table motion transmitting system connected therewith and a separate power means for the tool slide motion transmitting systems connected with the common initial driving shaft, said power means being each adjustable as to speed whereby the work table may be actuated at traverse and feeding rates and whereby the tool slide may be actuated through its vertical and horizontal paths simultaneously and sequentially at traverse and feeding rates, and separate control means for each power means whereby they may be simultaneously and individually actuated for thereby simultaneously and individually actuating the work table and tool slide through their paths at traverse and feeding rates, including separate pilot means for effecting the simultaneous actuation of the power means at traverse rates, feeding rates, and selectively at traverse and feeding rates for thereby correspondingly translating the work table and tool slide and whereby a tooling operation may be performed through a path other than the paths as individually defined by the translation of the work table and tool slide, and said control means further including separate pilot means for individually adjusting the feeding rate of the power means prior to and during the tooling operation whereby the tooling path may be varied.

27. A machine tool comprising, in combination, a support, a pair of translatable members mounted on said support and adapted to support a workpiece and a tool respectively, a separate motion imparting system for each translatable member and each motion imparting system including an initial driving shaft, said motion imparting systems being nonadjustable in speed and each including an initial driving shaft, a separate power plant for each motion imparting system and its translatable member, each power plant comprising a constant speed motor and an adjustable speed motor, said adjustable speed motor having a maximum speed less than the speed of the constant speed motor, separate means for each power plant for connecting its motors simultaneously with the initial driving shaft of its motion transmitting systems for moving its translatable member at a constant speed as determined by the constant speed motor and the motion imparting system thereof and at adjustable speeds as determined by the adjustment of its adjustable speed motor and its motion imparting system, and separate means for each power plant for starting and stopping the motors thereof.

28. A machine tool comprising, in combination, a support, a pair of translatable members mounted on said support and adapted to support a workpiece and a tool respectively, a separate motion imparting system for each translatable member and each motion imparting system including an initial driving shaft, said motion imparting systems being nonadjustable in speed and each including an initial driving shaft, a separate power plant for each motion imparting system and its translatable member, each power plant comprising a constant speed motor and an adjustable speed motor, said adjustable speed motor having a maximum speed less than the speed of the constant speed motor, separate means for each power plant for connecting its motors simultaneously with the initial driving shaft of its motion transmitting systems for moving its translatable member at a constant speed as determined by the constant speed motor and the motion imparting system thereof and at adjustable speeds as determined by the adjustment of its adjustable speed motor and its motion imparting system, separate means for each power plant for starting and stopping the motors thereof, and additional stop means common to both power plants for simultaneously stopping all motors.

29. A machine tool comprising, in combination, a support, a pair of translatable members mounted on said support and adapted to support a workpiece and a tool respectively, a separate motion imparting system for each translatable member and each motion imparting system including an initial driving shaft, said motion imparting systems being nonadjustable in speed and each including an initial driving shaft, a separate power plant for each motion imparting system and its translatable member, each power plant comprising a constant speed motor and an adjustable speed motor, said adjustable speed motor having a maximum speed less than the speed of the constant speed motor, separate means for each power plant for connecting its motors simultaneously with the initial driving shaft of its motion transmitting system for moving its translatable member at a constant speed as determined by the constant speed motor and the motion imparting system thereof and at adjustable speeds as determined by the adjustment of its adjustable speed motor and its motion imparting system, and separate operating members for each power plant for causing the simultaneous rotation of its motors to bring the load up to the determined constant speed and for cutting out in each power plant the constant speed motor and causing the rotation of the adjustable speed motor thereof only.

30. A machine tool comprising, in combination, a support, a pair of translatable members mounted on said support and adapted to support a workpiece and a tool respectively, a separate motion imparting system for each translatable member and each motion imparting system including an initial driving shaft, said motion imparting systems being nonadjustable in speed and each including an initial driving shaft, a separate power plant for each motion imparting system and its translatable member, each power plant comprising a constant speed motor and an adjustable speed motor, said adjustable speed motor having a maximum speed less than the speed of the constant speed motor, separate means for each power plant for connecting its motors simultaneously with the initial driving shaft of its motion transmitting system for moving its translatable member at a constant speed as determined by the constant speed motor and the motion imparting system thereof and at adjustable speeds as determined by the adjustment of its adjustable speed motor and its motion imparting system, separate operating members for each power plant for causing the simultaneous rotation of its motors to bring the load up to the determined constant speed and for cutting out in each power plant the constant speed motor and causing the rotation of the adjustable speed motor thereof only, and separate means for each power plant for effecting an adjustment of the speed of its adjustable speed motor whereby the work translatable member and tool translatable member may be actuated simultaneously at different speeds.

31. A machine tool comprising, in combination, a support, a pair of translatable members mounted on said support and adapted to support a workpiece and a tool respectively, a separate motion imparting system for each translatable member and each motion imparting system including an initial driving shaft, said motion imparting systems being nonadjustable in speed and each including an initial driving shaft, a separate power plant for each motion imparting system and its translatable member, each power plant comprising a constant speed motor and an adjustable speed motor, said adjustable speed motor having a maximum speed less than the speed of the constant speed motor, separate means for each power plant for connecting its motors simultaneously with the initial driving shaft of its motion transmitting system for moving its translatable member at a constant speed as determined by the constant speed motor and the motion imparting system thereof and at adjustable speeds as determined by the adjustment of its adjustable speed motor and its motion imparting system, separate operating members for each power plant for causing the simultaneous rotation of its motors to bring the load up to the determined constant speed and for cutting out in each power plant the constant speed motor and causing the rotation of the adjustable speed motor thereof only, and means for protecting the adjustable speed motor against damage when it is driven by the constant speed motor after the speed of the adjustable speed motor has been reached.

32. A machine tool comprising, in combination, a support, a pair of translatable members mounted on said support and adapted to support a workpiece and a tool respectively, a separate motion imparting system for each translatable member and each system including an initial driving shaft, said motion imparting systems being nonadjustable in speed, a separate power plant for each motion imparting system comprising a constant speed A.-C. motor and an adjustable speed D.-C. motor, said D.-C. motor having a maximum speed less than the speed of the A.-C. motor, said motors of each power plant being simultaneously connected with the initial driving shaft of its motion imparting system for moving its translatable member at a constant speed as determined by its A.-C. motor and its motion imparting system and at adjustable speeds as determined by the adjustment of its D.-C. motor and its motion imparting system, and separate operating means for each power plant for causing the simultaneous rotation of the A.-C. and D.-C. motors thereof for bringing the load up to the determined speed and for causing the rotation of the D.-C. motor of its power plant with a weakened field when being driven by the A.-C. motor after its speed is passed.

33. A machine tool comprising, in combination, a support, a pair of translatable members mounted on said support and adapted to support a workpiece and a tool respectively, a separate motion imparting system for each translatable member and each system including an initial driving shaft, said motion imparting systems being nonadjustable in speed, a separate power plant for each motion imparting system comprising a constant speed A.-C. motor and an adjustable speed D.-C. motor, said D.-C. motor having a maximum speed less than the speed of the A.-C. motor, said motors of each power plant being simultaneously connected with the initial driving shaft of its motion imparting system for moving its translatable member at a constant speed as determined by its A.-C. motor and its motion imparting system and at adjustable speeds as determined by the adjustment of its A.-C. motor and its motion imparting system, separate operating means for each power plant for causing the simultaneous rotation of the A.-C. and D.-C. motors thereof for bringing the load up to the determined speed and for causing the rotation of the D.-C. motor of its power plant with a weakened field when being driven by the A.-C. motor after its speed is passed, and additional means for each power plant for applying a braking to the D.-C. motor thereof for decelerating the speeds of the motors.

34. A machine tool comprising, in combination, a support, a pair of translatable members mounted on said support and adapted to support a workpiece and a tool respectively, a separate motion imparting system for each translatable member and each system including an initial driving shaft, said motion imparting systems being nonadjustable in speed, a separate power plant for each motion imparting system comprising a constant speed A.-C. motor and an adjustable speed D.-C. motor, said D.-C. motor having a maximum speed less than the speed of the D. C. motor, said motors of each power plant being simultaneously connected with the initial driving shaft of its motion imparting system for moving its translatable member at a constant speed as determined by its A.-C. motor and its motion imparting system and at adjustable speeds as determined by the adjustment of its D.-C. motor and its motion imparting system, and separate operating means for each power plant for causing the simultaneous rotation of the A.-C. and D.-C. motors thereof for bringing the load up to the determined speed and for causing the rotation of the D.-C. motor of its power plant with a weakened field when being driven by the A.-C. motor after its speed is passed, and additional means for each power plant for applying dynamic braking to its D.-C. motor for decelerating and stopping the translation of its members whether being translated by the A.-C. and D.-C. motors simultaneously or being translated by the D.-C. motor only.

35. A machine tool comprising, in combination, a support, a pair of translatable members mounted on said support and adapted to support a workpiece and a tool respectively, a separate motion imparting system for each translatable member and each system including an initial driving shaft, said motion imparting systems being nonadjustable in speed, a separate power plant for each motion imparting system comprising a constant speed A.-C. motor and an adjustable speed D.-C. motor, said D.-C. motor having a maximum speed less than the speed of the A.-C. motor, said motors of each power plant being simultaneously connected with the initial driving shaft of its motion imparting system for moving its translatable member at a constant speed as determined by its A.-C. motor and its motion imparting system and at adjustable speeds as determined by the adjustment of its D.-C. motor and its motion imparting system, and separate operating means for each power plant for causing the simultaneous rotation of the A.-C. and D.-C. motors thereof for bringing the load up to the determined speed and for causing the rotation of the D.-C. motor of its power plant with a weakened field when being driven by the A.-C. motor after its speed is passed, and for cutting out the A.-C. motor and causing the rotation of the D.-C. motor only, and means for each power plant for effecting an adjustment of the speed of its D.-C. motor whereby said work supporting member and tool supporting member may be simultaneously translated at different speeds.

36. A planer type milling machine comprising, in combination, a supporting bed, a work supporting table on said bed translatable relative thereto at a transverse rate in reverse directions, a motion transmitting train connected with the table and including an initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the initial driving shaft, an electric power source, a reversing switch between the power source and A.-C. motor, electronic control means between said power source and D.-C. motor for supplying rectified direct current to the D.-C. motor, and means for selectively reversely energizing the A.-C. motor reversing switch and simultaneously correspondingly connecting the rectified direct current with the D.-C. motor to effect the simultaneous rotation of said motors and thereby effect the translation of the work supporting table at traverse speeds with said D.-C. and A.-C. motors cooperating in bringing the load up to traverse speed.

37. A planer type milling machine comprising, in combination, a supporting bed, a work supporting table on said bed translatable relative thereto at a traverse rate in reverse directions, a motion transmitting train nonadjustable as to speed connected with the table and including an initial driving shaft, a power plant including a reversible constant speed A.-C. motor and a reversible adjustable speed D.-C. motor, means for simultaneously connecting said motors to the initial driving shaft, an electric power source, a reversing switch between the power source and A.-C. motor, electronic control means between said power source and D.-C. motor for supplying rectified direct current to the D.-C. motor, and means for selectively reversely energizing the A.-C. motor reversing switch and simultaneously correspondingly connecting the rectified direct current with the D.-C. motor to effect the simultaneous rotation of said motors and thereby effect the translation of the work supporting table, at traverse speeds with said D.-C. and A.-C motor cooperating in bringing the load up to traverse speed, including a magnetic circuit having therein reverse control switches selectively operable.

38. A planer type milling machine comprising, in combination, a supporting bed, a work supporting table on said bed translatable relative thereto at traverse and feed rates in reverse directions, a motion transmitting train nonadjustable as to speed connected with the table and including an initial driving shaft, a power plant including a reversible constant speed A.-C. motor and a reversible adjustable speed D.-C. motor, means for simultaneously connecting said motors to the initial driving shaft, an electric power source, a reversing switch between the power source and A.-C. motor, electronic control means between said power source and D.-C. motor for supplying rectified direct current to the D.-C. motor, means for selectively reversely energizing the A.-C. motor reversing switch and simultaneously correspondingly connecting the rectified direct current with the D.-C. motor to effect the simultaneous rotation of said motors and thereby effect the translation of the work supporting table, at traverse speeds with D.-C. and A.-C. motors cooperating in bringing the load up to traverse speed, including a magnetic circuit having therein reverse control switches selectively operable, and means in said magnetic control circuit for connecting the rectified direct current from the electronic current rectifier with the D.-C. motor only for effecting the rotation of the D.-C. motor at a feeding rate.

39. A planer type milling machine comprising, in combination, a supporting structure including a bed and side housing, a work supporting table on said bed translatable relative thereto at traverse and feeding rates in reverse directions, a side head on the side housing supporting a tool and translatable relative to the side housing at a traverse and feeding rates, a motion transmitting system for the table and including an initial driving shaft, a motion transmitting system for the side head and including an initial driving shaft, a power plant including an A.-C. motor and a D.-C. motor for the table motion transmitting system having its A.-C. and D.-C. motors simultaneously connected with the table motion transmitting system initial driving shaft, a second power plant including an A.-C. and a D.-C. motor for the side head motion transmitting system having its A.-C. and D.-C. motors simultaneously connected with the side head motion transmitting system initial driving shaft, and separate control means for each power plant whereby said power plants may be independently and simultaneously operated for effecting an independent movement of the table and side head relative to the other and the simultaneous movement of said table and side head.

40. A planar type milling machine comprising, in combination, a supporting structure including a bed and side housing, a work supporting table on said bed translatable relative thereto at traverse and feeding rates in reverse directions, a side head on the side housing supporting a tool and translatable relative to the side housing at traverse and feeding rates, a motion transmitting system for the table and including an initial driving shaft, a motion transmitting system for the side head and including an initial driving shaft, a power plant including an A.-C. motor and a D.-C. motor for the table motion transmitting system having its A.-C. and D.-C. motors simultaneously connected with the table motion transmitting system initial driving shaft, a second power plant including an A.-C. and D.-C. motor for the side head motion transmitting system having its A.-C. and D.-C. motors simultaneously connected with the side head motion transmitting system initial driving shaft, separate control means for each power plant whereby said power plant may be independently and simultaneously operated for effecting an independent movement of the table and side head relative to the other and the simultaneous movement of said table and side head, and additional separate control means whereby the D.-C. motor of the table power plant and side head power plant may be independently and simultaneously actuated for correspondingly actuating the table and side head.

41. A planar type milling machine comprising, in combination, a supporting bed, a work supporting table on said bed translatable relative thereto at traverse and feeding rates in reverse directions, a motion transmitting train nonadjustable as to speed connected with the table and including an initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the initial driving shaft, an electric power source, a reversing switch between the power source and A.-C. motor, electronic control means between said power source and D.-C. motor for supplying rectified direct current to the D.-C. motor, and means for selectively reversely energizing the A.-C. motor reversing switch and simultaneously correspondingly connecting the rectified direct current with the D.-C. motor to effect the simultaneous rotation of said motors and thereby effect the translation of the work supporting table at traverse speeds with said D.-C. motor and A.-C. motor cooperating in bringing the load up to traverse speed, and means operable upon deenergization of the A.-C. motor reversing switch for applying dynamic braking to the D.-C. motor and thereby effect the rapid deceleration of both the A.-C. and D.-C. motors.

42. A planar type milling machine comprising, in combination, a supporting bed, a work supporting table on said bed translatable relative thereto at traverse and feeding rates in reverse directions, a motion transmitting train nonadjustable as to speed connected with the table and including an initial driving shaft, a power plant including a reversible constant speed A.-C. motor and a reversible speed D.-C. motor, means for simultaneously connecting said motors to the initial driving shaft, an electric power source, a reversing switch between the power source and A.-C. motor, electronic control means between said power source and D.-C. motor for supplying rectified direct current to the D.-C. motor, means for selectively reversely energizing the A.-C. motor reversing switch and simultaneously correspondingly connecting the rectified direct current with the D.-C. motor to effect the simultaneous rotation of said motors and thereby effect the translation of the work supporting table, at traverse speeds with said D.-C. and A.-C. motor cooperating in bringing the load up to traverse speed, including a magnetic circuit having therein reverse control switches selectively operable, and means operable upon deenergization of the A.-C. motor reversing switch for applying dynamic braking to the D.-C. motor and thereby effect the rapid deceleration of both the A.-C. and D.-C. motors.

43. A planar type milling machine comprising, in combination, a supporting structure including a bed and a side housing adjacent thereto and extending upwardly thereof a work supporting table on said bed, a tool slide on said side housing and movable vertically thereof, a rail on said side housing extending transversely of the bed and movable relative to the side housing, a separate motion transmitting train for each tool slide and the rail, each motion transmitting train being nonadjustable as to speed and together having a common initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the common initial driving shaft, an electric power source, a reversing switch between the power source and the A.-C. motor, electronic control means between the power source and the D.-C. motor for supplying rectified direct current to the D.-C. motor, a D.-C. motor reversing switch between the electronic control means and the D.-C. motor, a magnetic control circuit including the A.-C. motor reversing switch and the D.-C. motor reversing switch, selectable control switches, in said magnetic circuit for simultaneously actuating the A.-C. motor and the D.-C. motor reversing switches for selectively actuating said motors in a given forward and reverse direction for thereby actuating the side housing tool slide and rail at traverse speed with the D.-C. motor and the A.-C. motor cooperating in bringing the load up to traverse speed.

44. A planer type milling machine comprising, in combination, a supporting structure including a bed and a side housing adjacent thereto and extending upwardly thereof, a work supporting table on said bed, a tool slide on said side housing and movable vertically thereof, a rail on said side housing extending transversely of the bed and movable relative to the side housing, a separate motion transmitting train for each the tool slide and the rail, each motion transmitting train being nonadjustable as to speed and together having a common initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the common driving shaft, an electric power source, a reversing switch between the power source and the A.-C. motor, electronic control means between the power source and the D.-C. motor for supplying rectified direct current to the D.-C. motor, a D.-C. motor reversing switch between the electronic control means and the D.-C. motor, a magnetic control circuit including the A.-C. motor reversing switch and the D.-C. motor reversing switch, selectable control switches in said magnetic circuit for simultaneously actuating the A.-C. motor and the D.-C. motor reversing switches for selectively actuating said motors in a given forward and reverse direction for thereby actuating the side housing tool slide and rail at traverse speed with the D.-C. motor and the A.-C. motor cooperating in bringing the load up to traverse speed, and means in said magnetic circuit for causing the D.-C. motor to rotate with a weakened field after its speed has been passed.

45. A planer type milling machine comprising, in combination, a supporting structure including a bed and a side housing adjacent thereto and extending upwardly thereof, a work supporting table on said bed, a tool slide on said side housing and movable vertically thereof, a rail on said side housing extending transversely of the bed and movable relative to the side housing, a separate motion transmitting train for each the tool slide and the rail, each motion transmitting train being nonadjustable as to speed and together having a common initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the common driving shaft, an electric power source, a reversing switch between the power source and the A.-C. motor, electronic control means between the power source and the D.-C. motor for supplying rectified direct current to the D.-C. motor, a D.-C. motor reversing switch between the electronic control means and the D.-C. motor, a magnetic control circuit including the A.-C. motor reversing switch and the D.-C. motor reversing switch, selectable control switches in said magnetic circuit for simultaneously actuating the A.-C. motor and D.-C. motor reversing switches for selectively actuating said motors in a given forward and reverse direction for thereby actuating the side housing tool slide and rail at traverse speed with the D.-C. motor and the A.-C. motor cooperating in bringing the load up to traverse speed, means in said magnetic circuit for causing the D.-C. motor to rotate with a weakened field after its speed has been passed, and additional means in said magnetic circuit for applying dynamic braking to the D.-C. motor upon deenergization of the A.-C. motor and the D.-C. motor reversing switches.

46. A planer type milling machine comprising, in combination, a supporting structure including a bed and a side housing adjacent thereto and extending upwardly thereof, a work supporting table on said bed, a tool slide on said side housing and movable vertically thereof, a rail on said side housing extending transversely of the bed and movable relative to the side housing, a separate motion transmitting train for each the tool slide and the rail, each motion transmitting train being nonadjustable as to speed and together having a common initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the common initial driving shaft, an electric power source, a reversing switch between the power source and the A.-C. motor, electronic control means between the power source and the D.-C. motor for supplying rectified direct current to the D.-C. motor, a D.-C. motor reversing switch between the electronic control means and the D.-C. motor, a magnetic control circuit including the A.-C. motor reversing switch and the D.-C. motor reversing switch, selectable control switches in said magnetic circuit for simultaneously actuating the A.-C. motor and the D.-C. motor reversing switches for selectively actuating said motors in a given forward and reverse direction for thereby actuating the side housing tool slide and the rail at traverse speed with the D.-C. motor and the A.-C. motor cooperating in bringing the load up to the traverse speed, and additional control means in the magnetic control circuit for energizing the D.-C. motor reversing switch only for actuating the said side housing tool slide and the rail at feeding rates.

47. A planer type milling machine comprising, in combination, a supporting structure including a bed and a side housing adjacent thereto and extending upwardly thereof, a work supporting table on said bed, a tool slide on said side housing and movable vertically thereof, a rail on said side housing extending transversely of the bed and movable relative to the side housing, a separate motion transmitting train for each the tool slide and the rail, each motion transmitting train being nonadjustable as to speed and together having a common initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the common initial driving shaft, an electric power source, a reversing switch between the power source and the A.-C. motor, electronic control means between the power source and the D.-C. motor for supplying rectified direct current to the D.-C. motor, a D.-C. motor reversing switch between the electronic control means and the D.-C. motor, a magnetic control circuit including the A.-C. motor reversing switch and the D.-C. motor reversing switch, selectable control switches in said magnetic circuit for simultaneously actuating the A.-C. and D.-C. motor reversing switches for selectively actuating said motors in a given forward and reverse direction for thereby actuating the side housing tool slide and the rail at traverse speeds with the D.-C. motor and the A.-C. motor cooperating in bringing the load up to the traverse speed, additional control means in the magnetic control circuit for energizing the D.-C. motor reversing switch only for actuating the said side housing tool slide and the rail at feeding rates, and additional means in the magnetic control circuit operable upon the deenergization of the A.-C. motor and the D.-C. motor reversing switches at the end of a traverse movement and upon deenergization of the D.-C. motor reversing switches at the end of a feeding movement for applying dynamic braking to said D.-C. motor and thereby rapidly decelerating the movement of the side housing tool slide and the rail.

48. A planer type milling machine comprising, in combination, a supporting structure including a bed and a side housing adjacent thereto and extending upwardly thereof, a work supporting table on said bed, a tool silde on said side housing and movable vertically thereof, a rail on said side housing extending transversely of the bed and movable relative to the side housing, a separate motion transmitting train for each the tool slide and the rail, each motion transmitting train being nonadjustable as to speed and together having a common initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the common initial driving shaft, an electric power source, a reversing switch between the power source and the A.-C. motor, electronic control means between the power source and the D.-C. motor for supplying rectified direct current to the D.-C. motor, a D.-C. motor reversing switch between the electronic control means and the D.-C. motor, a magnetic control circuit including the A.-C. motor reversing switch and the D.-C. motor reversing switch, selectable control switches in said magnetic circuit for simultaneously actuating the A.-C. and the D.-C. motor reversing switches for selectively actuating said motors in a given forward and reverse direction for thereby actuating the side housing tool slide and the rail at traverse speed with the D.-C. motor and the A.-C. motor cooperating in bringing the load up to traverse speed, and a clutch in each of the head and the rail motion transmitting trains whereby the side housing tool slide and the rail may be individually actuated at traverse speed.

49. A planer type milling machine comprising, in combination, a supporting structure including a bed and a side housing adjacent thereto and extending upwardly thereof, a work supporting table on said bed, a tool slide on said side housing and movable vertically thereof, a rail on said side housing extending transversely of the bed and movable relative to the side housing, a separate motion transmitting train for each the tool slide and the rail, each motion transmitting train being nonadjustable as to speed and together having a common initial driving shaft, a power plant including a reversible constant speed A.-C. motor and a reversible adjustable speed D.-C. motor, said D.-C. motor having a maximum speed less than the speed of the A.-C. motor, means for simultaneously connecting said motors to the common initial driving shaft, and electric power source, a reversing switch between the power source and the A.-C. motor, electronic control means between the power source and the D.-C. motor for supplying rectified direct current to the D.-C. motor, a D.-C. motor reversing switch between the electronic control means and the D.-C. motor, a magnetic control circuit including the A.-C. motor reversing switch and the D.-C. motor reversing switch, selectable control switches in said magnetic circuit for simultaneously actuating the A.-C. and D.-C. motor reversing switches for selectively actuating said motors in a given forward and reverse direction for thereby actuating the side housing tool slide and the rail at traverse speed with D.-C. motor and A.-C. motor cooperating in bringing the load up to traverse speed, a clutch in each of the head and the rail motion transmitting trains whereby the side housing tool slide and the rail may be individually actuated at traverse speed, a clamping mechanism for securing the rail to the side housing, and means between the rail motion transmitting train clutch and rail clamp whereby said rail motion transmitting train clutch and rail clamp are sequentially actuated.

50. A planer type milling machine comprising, in combination, a supporting structure comprising a bed and a side housing rising above the bed, a tool slide on said side housing movable relative thereto at traverse and feeding rates, a rail on said side housing overlying the bed in a plane thereabove, a rail tool slide on the rail movable longitudinally thereof at traverse and feeding rates, a separate motion transmitting train for the side housing tool slide and the rail tool slide, a reversing mechanism in said rail tool slide motion transmitting train, a clutch for connecting the rail tool slide motion transmitting train with the rail tool slide for translation inwardly or outwardly of the rail, a clutch for connecting the side housing tool slide with its motion transmitting train, said side housing tool slide motion transmitting train and said rail tool slide motion transmitting train having a common initial driving shaft, a power plant connected with said initial driving shaft.

51. In a machine tool the combination of a supporting structure, a work supporting table on said supporting structure movable relative thereto at traverse and feeding rates, a motion imparting train for said table, reversible power means adjustable as to speed connected with the table motion imparting train for effecting the movement of the table at traverse rate and at adjustable feed rates, a first tool slide on said supporting structure movable relative thereto at traverse and feeding rates, a support slide on said supporting structure movable relative thereto at traverse and feeding rates, a second tool slide on said support slide and movable relative thereto at traverse and feeding rates, a separate motion imparting train to each the first tool slide, the support slide, and the second tool slide, said motion imparting trains for said slides terminating in a common initial driving shaft, reversible power means adjustable as to speed connected with said common initial driving shaft, for effecting the movement of the said first tool slide, support slide, and second tool slide at traverse and feeding rates, clutch means in each motion transmitting train for the first tool slide, support slide, and the second tool slide whereby they may be selectively and simultaneously connected with the initial driving shaft and power means, and additional clutch means for selectively reversely actuating the second tool slide relative to said support slide.

52. In a machine tool the combination of a supporting structure, a work supporting table on said supporting structure movable relative thereto at traverse and feeding rates, a motion imparting train for said table, reversible power means adjustable as to speed connected with the table motion imparting train for effecting the movement of the table at traverse rate and at adjustable feeding rates, a first tool slide on said supporting structure movable relative thereto at traverse and feeding rates, a support slide on said supporting structure movable relative thereto at traverse and feeding rates, a second tool slide on the support slide and movable relative thereto at traverse and feeding rates, a separate motion imparting train to each the first tool slide, the support slide, and the second tool slide, said motion imparting trains for said slides terminating in a common initial driving shaft, a reversible power means adjustable as to speed connected with said common initial driving shaft for effecting the movement of the said first tool slide, support slide, and second tool slide at traverse and feeding rates, clutch means in each motion transmitting train for the first tool slide, support slide, and the second tool slide whereby they may be selectively and simultaneously connected with the initial driving shaft, and power means, additional clutch means for selectively reversely actuating the second tool slide relative to said support slide, the support slide being adapted to be secured against movement relative to the supporting structure during the movement of the second tool slide relative thereto, clamping means for effecting the securing of the support slide to the supporting structure and means for connecting the clutch in the slide motion transmitting train and the slide clamp whereby they are sequentially actuated.

53. In a machine tool the combination of a supporting structure, a work supporting table on said supporting structure movable relative thereto at traverse and feeding rates, a motion imparting train for said table, reversible power means adjustable as to speed connected with the table motion imparting train for effecting the movement of the table at traverse rates and at adjustable feed rates, a first tool slide on said supporting structure movable relative thereto at traverse and feeding rates, a support slide on said supporting structure movable relative thereto at traverse and feeding rates, a second tool slide on the support slide and movable relative thereto at traverse and feeding rates, a separate motion imparting train to each the first tool slide, the support slide, and the second tool slide, said motion imparting trains for said slides terminating in a common initial driving shaft, reversible power means adjustable as to speed connected with said common initial driving shaft for effecting the movement of the said first tool slide, support slide, and second tool slide at traverse and feeding rates, clutch means in each motion transmitting train for the first tool slide, the support slide, and the second tool slide whereby they may be selectively and simultaneously connected with the initial driving shaft and power means, additional clutch means for selectively reversely actuating the second tool slide relative to said support slide, and control means for the table power means and the slide power means whereby they may be independently and simultaneously actuated for correspondingly operating their motion transmitting trains.

54. In a machine tool the combination of a supporting structure, a work supporting table on said supporting structure movable relative thereto at traverse and feeding rates, a motion imparting train for said table, reversible power means adjustable as to speed connected with the table motion imparting train for effecting the movement of the table at traverse rates and at adjustable feed rates, a first tool slide on said supporting structure movable relative thereto at traverse and feeding rates, a support slide on said supporting structure movable relative thereto at traverse and feeding rates, a second tool slide on the support slide and movable relative thereto at traverse and feeding rates, a separate motion imparting train to each the first tool slide, the support slide and the second tool slide, said motion imparting trains for said slides terminating in a common initial driving shaft, reversible power means adjustable as to speed connected with said common initial driving shaft for effecting the movement of the said first tool slide, support slide, and second tool slide at traverse and feeding rates, clutch means in each motion transmitting train for the first tool slide, the support slide, and the second tool slide whereby they may be selectively and simultaneously connected with the initial driving shaft and power means, additional clutch means for selectively reversely actuating the second tool slide relative to its supporting slide, control means for the table power means and the slide power means whereby they may be independently and simultaneously actuated for correspondingly operating their motion transmitting trains, and additional control means for adjusting the rate of operation of the table power means and the slide power means whereby the motion transmitting trains may be actuated at adjustable feed rates for correspondingly actuating the table and the slides.

55. In a machine tool the combination of a supporting structure, a work supporting table on said supporting structure movable relative thereto at traverse and feeding rates, a motion imparting train for said table, reversible power means adjustable as to speed connected with the table motion imparting train for effecting the movement of the table at traverse and adjustable feed rates, a first tool slide on said supporting structure movable relative thereto at traverse and feeding rates, a support slide on said supporting structure movable relative thereto at traverse and feeding rates, a second tool slide on the support slide and movable relative thereto at traverse and feeding rates, a separate motion imparting train to each the first tool slide, the support slide, and the second tool slide, said motion imparting trains for said slides terminating in a common initial driving shaft, reversible power means adjustable as to speed connected with said common initial driving shaft for effecting the movement of the said first tool slide, support slide, and second tool slide at traverse and feeding rates, clutch means in each motion transmitting train for the first tool slide, the support slide, and the second tool slide whereby they may be selectively and simultaneously connected with the initial driving shaft and power means, additional clutch means for selectively reversely actuating the second tool slide relative to its supporting slide, each of said power means including a pair of motors cooperating with one another in effecting the operation of the motion transmitting trains operated thereby, control switches for each power means, and a plugging switch associated with the motors of each power means for cooperation therewith in decelerating the rotation of the motors.

WALTER B. WIGTON.
JESSE DAUGHERTY.

REFERENCES CITED

The following references are of record in the file of this patent:

UNITED STATES PATENTS

| Number | Name | Date |
|---|---|---|
| 1,598,202 | LaDucer | Aug. 31, 1926 |
| 1,796,332 | Johnson | Mar. 17, 1931 |
| 2,007,180 | Doran et al. | July 9, 1935 |
| 2,029,335 | Oberhoffken et al. | Feb. 4, 1936 |
| 2,081,288 | Armitage | May 25, 1937 |
| 2,089,814 | Ridgway | Aug. 10, 1937 |
| 2,169,484 | Armitage | Aug. 15, 1939 |